United States Patent
Vega et al.

(10) Patent No.: US 12,326,063 B2
(45) Date of Patent: Jun. 10, 2025

(54) NON-REACTIVE COLLOID PARTICLES TO STOP GAS MIGRATION IN EXPANDABLE METAL APPLICATIONS

(71) Applicant: Halliburton Energy Services, Inc., Houston, TX (US)

(72) Inventors: Roberto Vega, Singapore (SG); Rutger Evers, Singapore (SG); Michael Linley Fripp, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/466,132

(22) Filed: Sep. 13, 2023

(65) Prior Publication Data
US 2025/0084722 A1    Mar. 13, 2025

(51) Int. Cl.
*E21B 33/12* (2006.01)
*C09K 8/32* (2006.01)
*E21B 33/16* (2006.01)

(52) U.S. Cl.
CPC .............. *E21B 33/165* (2020.05); *C09K 8/32* (2013.01); *E21B 33/12* (2013.01); *E21B 33/1208* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 7,576,042 B2 | 8/2009 | Lewis et al. | |
| 7,687,440 B2 | 3/2010 | Reddy et al. | |
| 2011/0162842 A1 | 7/2011 | Cangemi et al. | |
| 2018/0340112 A1 | 11/2018 | Van Dyk et al. | |
| 2021/0010124 A1 | 1/2021 | Li | |
| 2021/0189817 A1* | 6/2021 | Fripp | E21B 23/01 |
| 2022/0178222 A1* | 6/2022 | Fripp | E21B 33/1208 |
| 2022/0186104 A1* | 6/2022 | Fripp | C09K 8/565 |
| 2022/0186579 A1* | 6/2022 | Pelto | E21B 23/06 |
| 2022/0381107 A1 | 12/2022 | Greci et al. | |

FOREIGN PATENT DOCUMENTS

| | | |
|---|---|---|
| CN | 205638339 U | 10/2016 |
| CN | 205778712 U | 12/2016 |
| WO | 2013033531 A1 | 3/2013 |
| WO | 2019169423 A1 | 9/2019 |

* cited by examiner

*Primary Examiner* — Andrew Sue-Ako
(74) *Attorney, Agent, or Firm* — Scott Richardson; Parker Justiss, P.C.

(57) ABSTRACT

Provided are a downhole tool, a well system, and a method. The downhole tool, in one aspect, includes a housing, as well as an expandable metal member positioned about the housing, the expandable metal member comprising a metal configured to expand in response to hydrolysis. The downhole tool, according to one aspect, further includes colloid particles surrounding a surface of the expandable metal member.

37 Claims, 27 Drawing Sheets

NON-REACTIVE COLLOID PARTICLES TO STOP GAS MIGRATION IN EXPANDABLE METAL APPLICATIONS

BACKGROUND

Wellbores are drilled into the earth for a variety of purposes including accessing hydrocarbon bearing formations. A variety of downhole tools may be used within a wellbore in connection with accessing and extracting such hydrocarbons. Throughout the process, it may become necessary to isolate sections of the wellbore in order to create pressure zones. Downhole tools, such as frac plugs, bridge plugs, packers, and other suitable tools, may be used to isolate wellbore sections. Wellbore anchors may also be used to fix one or more downhole tools within the wellbore.

BRIEF DESCRIPTION

Reference is now made to the following descriptions taken in conjunction with the accompanying drawings, in which.

Figure 1:
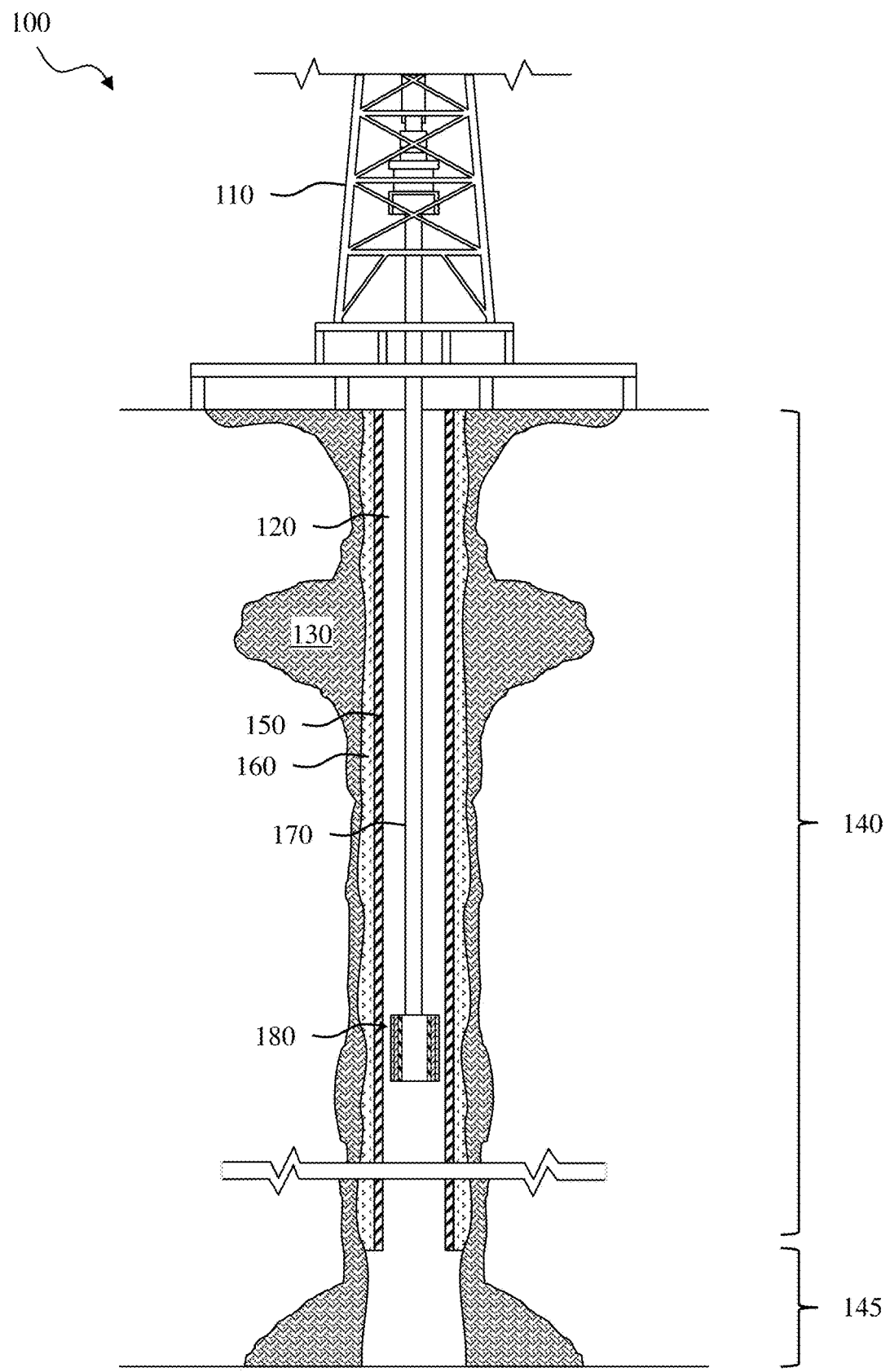
FIG. 1 illustrates a perspective view of a well system including an exemplary operating environment that the apparatuses, systems and methods disclosed herein may be employed.

FIGS. 8A through 8F illustrate various different views of a well system and downhole tool designed, manufactured and/or operated according to one or more embodiments of the disclosure at different stages of deployment; and FIGS. 9A through 9J illustrate various different views of a well system and downhole tool designed, manufactured and/or operated according to one or more embodiments of the disclosure at different stages of deployment.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

The present disclosure is based, at least in part, on the acknowledgment that the use of expandable metal in wellbore applications may be problematic under certain circumstances. For example, in certain instances once the expandable metal has encountered reactive fluid and expanded to expanded metal, fluid and/or gas may still migrate through the expanded metal. In one or more embodiments, the gas is able to migrate through interstitial spaces located in the expanded metal. Such issues may be problematic when the expandable metal is used in pressure isolation applications (e.g., frac plugs, bridge plugs, packers, plug and abandonments, etc.).

With this acknowledgment in mind, the present disclosure has recognized that by adding colloid particles to the resulting expanded metal, the gas migration problem discussed above may be significantly reduced and/or eliminated. In yet other embodiments, small colloid particles, extremely small colloid particles, excessively small colloid particles, or any combination thereof, may be added to the resulting expanded metal. The phrase "colloid particles," as used herein, is intended to mean particles with a greatest dimension of no more than 500 nm. The phrase "small colloid particles," as used herein, is intended to mean particles with a greatest dimension of no more than 300 nm. The phrase "extremely small colloid particles," as used herein, is intended to mean particles with a greatest dimension of no more than 150 nm. The phrase "excessively small colloid particles," as used herein, is intended to mean particles with a greatest dimension of no more than 50 nm. In at least one additional embodiment, all the colloid particles within the resulting expanded metal range from 1 nm to 500 nm, if not 1 nm to 100 nm, if not 5 nm to 50 nm.

The colloid particles, in at least one embodiment, are non-reactive colloid particles. For example, non-reactive clay particles could be used. In at least one other embodiment, the colloid particles are non-reactive polymer particles, such as latex particles. The latex can be a natural product or it can be formed through a synthetic reaction, such as an emulsion polymerization reaction. Latex is a colloidal dispersion and most latex consists of polymeric particles dispersed in a continuous medium. The latex can be synthesized from a range of monomers including acrylate (such as methyl methacrylate, butyl acrylate, ethylhexyl acrylate), styrene, vinyl acetate, and butadiene. Copolymers can also be used (such as styrene-acrylic, and styrene-butadiene). Increasing the ratio of styrene (Tg=+100° C.) to butadiene (Tg=−85° C.) may be used to increase the operating temperature of the latex. The ratio of styrene (high tensile strength) to butadiene (high elasticity) may also be used to influence the mechanical behavior of the resulting seal.

In yet another embodiment, the colloid particles are ionically charged colloid particles. The hydrolysis reaction that converts the expandable metal to expanded metal converts the expandable metal into a metal hydroxide. The multivalent metal ions of the expandable metal ($Ca^{+2}$, $Al^{+3}$, $Mg^{+2}$) can induce the ionically charged colloid particles to become unstable and to allow the colloidal particles to pull together. Too much stability can prevent adhesion and filler acceptance, while too little stability can result in the colloid particles not remaining dispersed until use. The byproducts of the hydrolysis reaction will destabilize the colloid particles and will result in the colloid particles becoming a better filler precisely at the point that the filler properties are desired and at the point when the dispersion behaviors are no longer necessary. Stabilization can be added to the colloid particles in order to prolong the stability of the colloid particles. Stabilization commonly uses nonionic surfactants with hydrophilic chains (such as vinyl carboxylic acid, steric stabilizers, surfactants, etc.). Anionic and cationic surfactants can also be used.

The colloid particles may be included within the expanded metal in a number of different manners. For example, in at least one embodiment, the colloid particles may be positioned proximate the expandable metal in a powder form, but sometime prior to the expandable metal expanding to expanded metal, the powder of colloid particles encounter a fluid thereby forming a colloidal dispersion of colloid particles. This transition of the powder based colloid particles to the colloidal dispersion of colloid particles may occur downhole. For example, a dissolvable sleeve could hold the powder of colloid particles proximate the expandable metal until such time as the expandable metal is to undergo the hydrolysis, at which time it would mix with surrounding fluid to form the colloidal dispersion of colloid particles.

Those skilled in the art understand the different types of dissolvable materials that may be used for the dissolvable sleeve and remain within the scope of the disclosure. While a dissolvable sleeve has been discussed, other removable (e.g., slidable) sleeves may be used and remain within the scope of the disclosure. In at least one embodiment, the fluid is a reactive fluid, such that a reactive colloidal dispersion of colloid particles is achieved that would start the hydrolysis reaction.

In yet another embodiment, the colloid particles form a part of a non-reactive colloidal dispersion of colloid particles positioned proximate the expandable metal. Again, a sleeve (e.g., dissolvable sleeve) could hold the non-reactive colloidal dispersion of colloid particles proximate the expandable metal until such time as the expandable metal is to undergo the hydrolysis, at which time the colloid particles would mix with surrounding reactive fluid to form a reactive colloidal dispersion of colloid particles, thereby starting the hydrolysis reaction.

In yet another embodiment, a reactive colloidal dispersion of colloid particles may be pumped downhole until it encounters the expandable metal, at which time the hydrolysis reaction would begin. In such an embodiment, the reactive colloidal dispersion of colloid particles might fill an entirety of the wellbore above the expandable metal and at least a portion of the wellbore below the expandable metal. Nevertheless, in yet other embodiments, a small slug of the reactive colloidal dispersion of colloid particles could be pumped downhole (e.g., pinned between a downhole slug of unreactive fluid without the colloid particles and an uphole slug of fluid) until it encounters the expandable metal, at which time the hydrolysis reaction would begin.

In certain embodiments, the colloidal dispersion of colloid particles is a sturdy colloidal dispersion of colloid particles, or an extremely sturdy colloidal dispersion of colloid particles, or an excessively sturdy colloidal dispersion of colloid particles. The phrase "colloidal dispersion," as used herein, is intended to mean that less than 30 percent of the colloid particles would settle out of the dispersion within a 24 hour period. The phrase "sturdy colloidal dispersion," as used herein, is intended to mean that less than 15 percent of the colloid particles would settle out of the dispersion within a 24 hour period. The phrase "extremely sturdy colloidal dispersion," as used herein, is intended to mean that less than 10 percent of the colloid particles would settle out of the dispersion within a 24 hour period. The phrase "excessively sturdy colloidal dispersion," as used herein, is intended to mean that less than 5 percent of the colloid particles would settle out of the dispersion within a 24 hour period.

In certain embodiments, the mass of the colloidal particles can be less than or equal to the mass of the expandable metal in the pre-expanded form. In some embodiments, the mass of the colloidal particles ranges from 1% to 50% of the mass of the expandable metal in the pre-expanded form. The phrase "mass of the colloidal particles," as used herein, is intended to mean the mass of the solids in the colloidal suspension, or alternatively the mass of the powder of colloidal particles. The phrase "a low colloidal mass," as used herein, is intended to mean that the mass of the colloidal particles is less than 25% of the mass of the expandable metal in the pre-expanded form. The phrase "a very low colloidal mass," as used herein, is intended to mean that the mass of the colloidal particles is less than 8% of the expandable metal in the pre-expanded form. The phrase "an extremely low colloidal mass," as used herein, is intended to mean that the mass of the colloidal particles is less than 2% of the expandable metal in the pre-expanded form.

Referring to FIG. 1, depicted is a perspective view of a well system 100 including an exemplary operating environment that the apparatuses, systems and methods disclosed herein may be employed. For example, the well system 100 could use a downhole tool including expandable metal according to any of the embodiments, aspects, applications, variations, designs, etc. disclosed in the following paragraphs. The well system 100 illustrated in FIG. 1 includes a drilling rig 110 extending over and around a wellbore 120 formed in a subterranean formation 130. As those skilled in the art appreciate, the wellbore 120 may be fully cased, partially cased, or an open hole wellbore. In the illustrated embodiment of FIG. 1, the wellbore 120 is partially cased, and thus includes a cased region 140 and an open hole region 145. The cased region 140, as is depicted, may employ casing 150 that is held into place by cement 160.

The well system 100 illustrated in FIG. 1 additionally includes a downhole conveyance 170 deploying a downhole tool 180 within the wellbore 120. The downhole conveyance 170 can be, for example, tubing-conveyed, wireline, slickline, work string, or any other suitable means for conveying the downhole tool 180 into the wellbore 120. In one particular advantageous embodiment, the downhole conveyance 170 is American Petroleum Institute "API" pipe.

The downhole tool 180, may comprise many different downhole tools employing expandable metal and remain within the scope of the disclosure. In the illustrated embodiment, however, the downhole tool 180 includes a housing, as well as an expandable metal member positioned about the housing, the expandable metal member comprising a metal configured to expand in response to hydrolysis. The downhole tool, in the illustrated embodiment of FIG. 1, may additionally include colloid particles surrounding a surface of the expandable metal member.

The term expandable metal, as used herein, refers to the expandable metal in a pre-expansion form. Similarly, the term expanded metal, as used herein, refers to the resulting expanded metal after the expandable metal has been subjected to reactive fluid, as discussed below. The expanded metal, in accordance with one or more aspects of the disclosure, comprises a metal that has expanded in response to hydrolysis. In certain embodiments, the expanded metal includes residual unreacted metal. For example, in certain embodiments the expanded metal is intentionally designed to include the residual unreacted metal. The residual unreacted metal has the benefit of allowing the expanded metal to self-heal if cracks or other anomalies subsequently arise, or for example to accommodate changes in the tubular or housing diameter due to variations in temperature and/or pressure. Nevertheless, other embodiments may exist wherein no residual unreacted metal exists in the expanded metal. In at least one embodiment, the residual unreacted metal exists when the expandable metal has expanded into contact with another feature, such as another wellbore tubular, prior to all of the expanded metal reacting into expanded metal. Once the expanded metal has sealed against this wellbore tubular, the reactive fluid may no longer reach the expandable metal, and the hydrolysis essentially ends. Similarly, if all of the expandable metal has reacted into expanded metal prior to sealing against the wellbore tubular, the expanded metal may ultimately wash away.

The expandable metal, in some embodiments, may be described as expanding to a cement like material. In other words, the expandable metal goes from metal to micronscale particles and then these particles expand and lock together to, in essence, seal two or more surfaces together. The reaction may, in certain embodiments, occur in less than 2 days in a reactive fluid and in certain temperatures. Nevertheless, the time of reaction may vary depending on the reactive fluid, the expandable metal used, the downhole temperature, surface-area-to-volume ratio (SA:V) of the expandable metal, etc..

In some embodiments, the reactive fluid may be a brine solution such as may be produced during well completion activities, and in other embodiments, the reactive fluid may be one of the additional solutions discussed herein (e.g., water-based mud). The expandable metal is electrically conductive in certain embodiments. The expandable metal, in certain embodiments, has a yield strength greater than about 8,000 psi, e.g., 8,000 psi+/−50%. The expandable metal, in at least one embodiment, has a minimum dimension greater than about 1.25 mm (e.g., approximately 0.05 inches).

The hydrolysis of the expandable metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

It should be noted that the starting expandable metal, unless otherwise indicated, is not a metal oxide (e.g., an insulator). In contrast, the starting expandable metal has, in certain embodiments, the properties of traditional metals: 1) Highly conductive to both electricity and heat (e.g., greater than 1,000,000 siemens per meter); 2) Contains a metallic bond (e.g., the outermost electron shell of each of the metal atoms overlaps with a large number of neighboring atoms). As a consequence, the valence electrons are allowed to move from one atom to another and are not associated with any specific pair of atoms. This gives metals their conductive nature; 3) Malleable and ductile, for example deforming under stress without cleaving; and 4) Tend to be shiny and lustrous with high density. In contrast, metal oxides are ceramics, and are dull, insulating, fragile, brittle and are not conductive metals.

The hydration reactions for magnesium is:

$$Mg + 2H_2O \rightarrow Mg(OH)_2 + H_2,$$

where $Mg(OH)_2$ is also known as brucite. Another hydration reaction uses aluminum hydrolysis. The reaction forms a material known as Gibbsite, bayerite, boehmite, aluminum oxide, and norstrandite, depending on form. The possible hydration reactions for aluminum are:

$$Al + 3H_2O \rightarrow Al(OH)_3 + \tfrac{3}{2}H_2.$$

$$Al + 2H_2O \rightarrow AlO(OH) + \tfrac{3}{2}H_2$$

$$Al + \tfrac{3}{2}H_2O \rightarrow \tfrac{1}{2}Al_2O_3 + \tfrac{3}{2}H_2$$

Magnesium hydroxide is considered to be relatively insoluble in water. Aluminum hydroxide can be considered an amphoteric hydroxide, which has solubility in strong acids or in strong bases. Alkaline earth metals (e.g., Mg, Ca, etc.) work well for the expandable metal, but transition metals (Al, etc.) also work well for the expandable metal. In one embodiment, the metal hydroxide is dehydrated by the swell pressure to form a metal oxide.

In at least one embodiment, the expandable metal is a non-graphene based expandable metal. By non-graphene based material, it is meant that is does not contain graphene, graphite, graphene oxide, graphite oxide, graphite intercalation, or in certain embodiments, compounds and their derivatized forms to include a function group, e.g., including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. In at least one other embodiment, the expandable metal does not include a matrix material or an exfoliatable graphene-based material. By not being exfoliatable, it means that the expandable metal is not able to undergo an exfoliation process. Exfoliation as used herein refers to the creation of individual sheets, planes, layers, laminae, etc. (generally, "layers") of a graphene-based material; the delamination of the layers; or the enlargement of a planar gap between adjacent ones of the layers, which in at least one embodiment the expandable metal is not capable of.

In yet another embodiment, the expandable metal does not include graphite intercalation compounds, wherein the graphite intercalation compounds include intercalating agents such as, for example, an acid, metal, binary alloy of an alkali metal with mercury or thallium, binary compound of an alkali metal with a Group V element (e.g., P. As, Sb, and Bi), metal chalcogenide (including metal oxides such as, for example, chromium trioxide, $PbO_2$, $MnO_2$, metal sulfides, and metal selenides), metal peroxide, metal hyperoxide, metal hydride, metal hydroxide, metals coordinated by nitrogenous compounds, aromatic hydrocarbons (benzene, toluene), aliphatic hydrocarbons (methane, ethane, ethylene, acetylene, n-hexane) and their oxygen derivatives, halogen, fluoride, metal halide, nitrogenous compound, inorganic compound (e.g., trithiazyl trichloride, thionyl chloride), organometallic compound, oxidizing compound (e.g., peroxide, permanganate ion, chlorite ion, chlorate ion, perchlorate ion, hypochlorite ion, $As_2O_5$, $N_2O_5$, $CH_{3D}lO_4$, $(NH_4)_2S_2O_8$, chromate ion, dichromate ion), solvent, or a combination comprising at least one of the foregoing. Thus, in at least one embodiment, the expandable metal is a structural solid expanded metal, which means that it is a metal that does not exfoliate and it does not intercalate. In yet another embodiment, the expandable metal does not swell by sorption.

In an embodiment, the expandable metal used can be a metal alloy. The expandable metal alloy can be an alloy of the base expandable metal with other elements in order to either adjust the strength of the expandable metal alloy, to adjust the reaction time of the expandable metal alloy, or to adjust the strength of the resulting metal hydroxide byproduct, among other adjustments. The expandable metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the expandable metal alloy can be alloyed with a dopant that promotes corrosion, such as Ni—Nickel, Fe—Iron, Cu—Copper, Co—Cobalt, Ir—Iridium, Au—Gold, C—Carbon, Ga—Gallium, In—Indium, Mg—Mercury, Bi—Bismuth, Sn—Tin, and Pd—Palladium. The expandable metal alloy can be constructed in a solid solution process where the elements are combined with molten metal or metal alloy. Alternatively, the expandable metal alloy could be constructed with a powder metallurgy process. The expandable metal can be cast, forged, extruded, sintered, welded, mill machined, lathe machined, stamped, croded or a combination thereof. The metal alloy can be a mixture of the metal and metal oxide. For example, a powder mixture of aluminum and aluminum oxide can be ball-milled together to increase the reaction rate.

Optionally, non-expanding components may be added to the starting metallic materials. For example, ceramic, elastomer, plastic, epoxy, glass, or non-reacting metal components can be embedded in the expandable metal or coated on the surface of the expandable metal. In yet other embodiments, the non-expanding components are metal fibers, a composite weave, a polymer ribbon, or ceramic granules, among others. In one variation, the expandable metal is formed in a serpentinite reaction, a hydration and metamorphic reaction. In one variation, the resultant material resembles a mafic material. Additional ions can be added to the reaction, including silicate, sulfate, aluminate, carbonate, and phosphate. The metal can be alloyed to increase the reactivity or to control the formation of oxides.

The expandable metal can be configured in many different fashions, as long as an adequate volume of material is available for supporting the necessary features. For example, the expandable metal may be formed into a single long member, multiple short members, rings, among others. In another embodiment, the expandable metal may be formed into a long wire of expandable metal, which can be in turn be wound around a housing as a sleeve. The wire diameters do not need to be of circular cross-section, but may be of any cross-section. For example, the cross-section of the wire could be oval, rectangle, star, hexagon, keystone, hollow braided, woven, twisted, among others, and remain within the scope of the disclosure. In certain other embodiments, the expandable metal is a collection of individual separate chunks of the metal held together with a binding agent. In yet other embodiments, the expandable metal is a collection of individual separate chunks of the metal that are not held together with a binding agent, but held in place using one or more different techniques, including an enclosure (e.g., an enclosure that could be crushed to expose the individual separate chunks to the reactive fluid), a cage, etc.

Additionally, a delay coating or protective layer may be applied to one or more portions of the expandable metal to delay the expanding reactions. In one embodiment, the material configured to delay the hydrolysis process is a fusible alloy. In another embodiment, the material configured to delay the hydrolysis process is a eutectic material. In yet another embodiment, the material configured to delay the hydrolysis process is a wax, oil, or other non-reactive material. The delay coating or protective layer may be applied to any of the different expandable metal configurations disclosed above.

Figure 2:
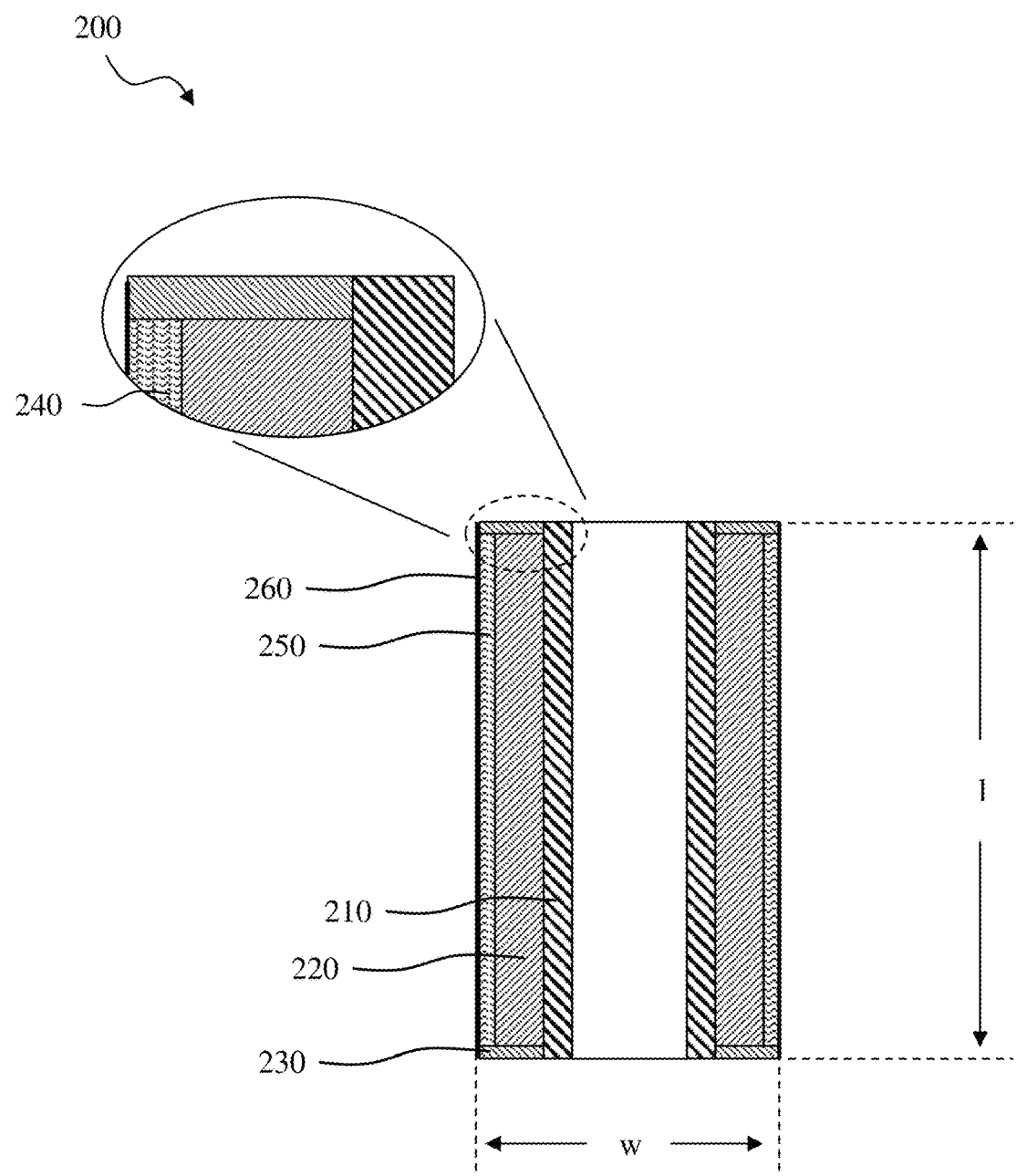
FIG. 2 illustrates one embodiment of a downhole tool designed, manufactured and/or operated according to one or more embodiments of the disclosure.

Turning to FIG. 2, illustrated is one embodiment of a downhole tool 200 designed, manufactured and/or operated according to one or more embodiments of the disclosure. The downhole tool 200, in the illustrated embodiment, has a length (l) and a width (w). The downhole tool 200, in the illustrated embodiment, further includes a housing 210. The housing 210, in one or more embodiments, may be a tubular housing or a solid housing, regardless of cross-sectional shape. The housing 210 may additionally be a mandrel. Moreover, the housing 210 may comprise many different materials, including metal, and remain within the scope of the disclosure.

The downhole tool 200, in the embodiment of FIG. 2, additionally includes an expandable metal member 220 positioned radially about the housing 210, the expandable metal member 220 comprising a metal configured to expand in response to hydrolysis. In at least one embodiment, the expandable metal member 220 is placed radially outside of the housing 210, such as is the case if the housing 210 is a mandrel. In yet another embodiment, the expandable metal member 220 may be placed radially inside of the housing 210, such as is the case if the housing 210 is a tubular. The expandable metal member 220 may include any of the expandable metal member materials and configurations disclosed above. Nevertheless, in the embodiment of FIG. 2, the expandable metal member 220 is a single long member positioned between a pair of end rings 230 (e.g., metal end rings).

In accordance with one embodiment of the disclosure, colloid particles 240 surround a surface of the expandable metal member 220. In at least one embodiment, the colloid particles 240 surround a radial outer surface of the expandable metal member 220. However, in other embodiments, the colloid particles 240 surround a radial inner surface of the expandable member 220. In yet other embodiments, the colloid particles surround another non-radial surface of the expandable member 220. In the illustrated embodiment, the colloid particles 240 form a part of a non-reactive colloidal dispersion of colloid particles 250, as discussed above. For example, the colloid particles 240 may be dispersed within a non-reactive fluid, such as oil or oil based mud. Furthermore, in the illustrated embodiment, a dissolvable sleeve 260 holds the non-reactive colloidal dispersion of colloid particles 250 proximate the expandable metal member 220 until such time as the expandable metal member 220 is to undergo the hydrolysis.

Figure 3A:
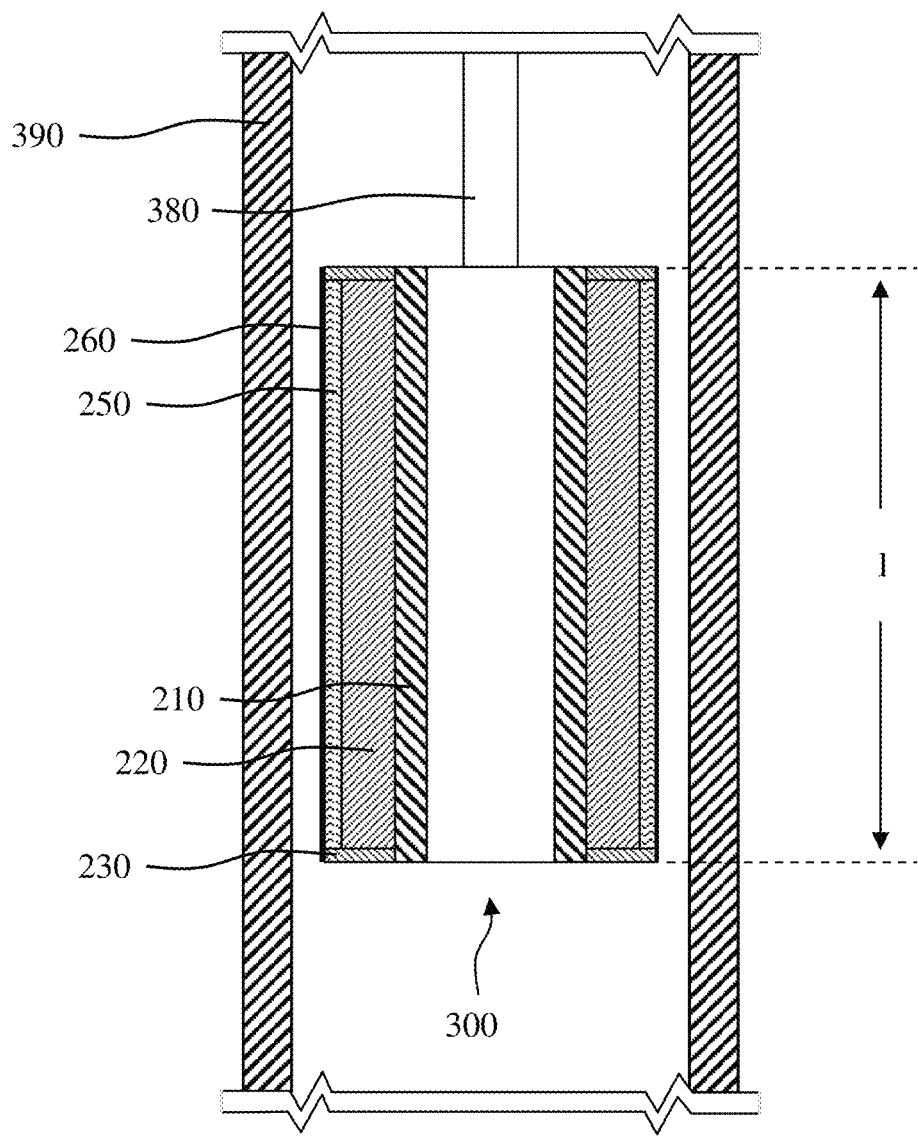
FIGS. 3A through 3C illustrate various different views of a downhole tool designed, manufactured and/or operated according to one or more embodiments of the disclosure coupled to a conveyance and deployed within a wellbore tubular.
Figure 3B:
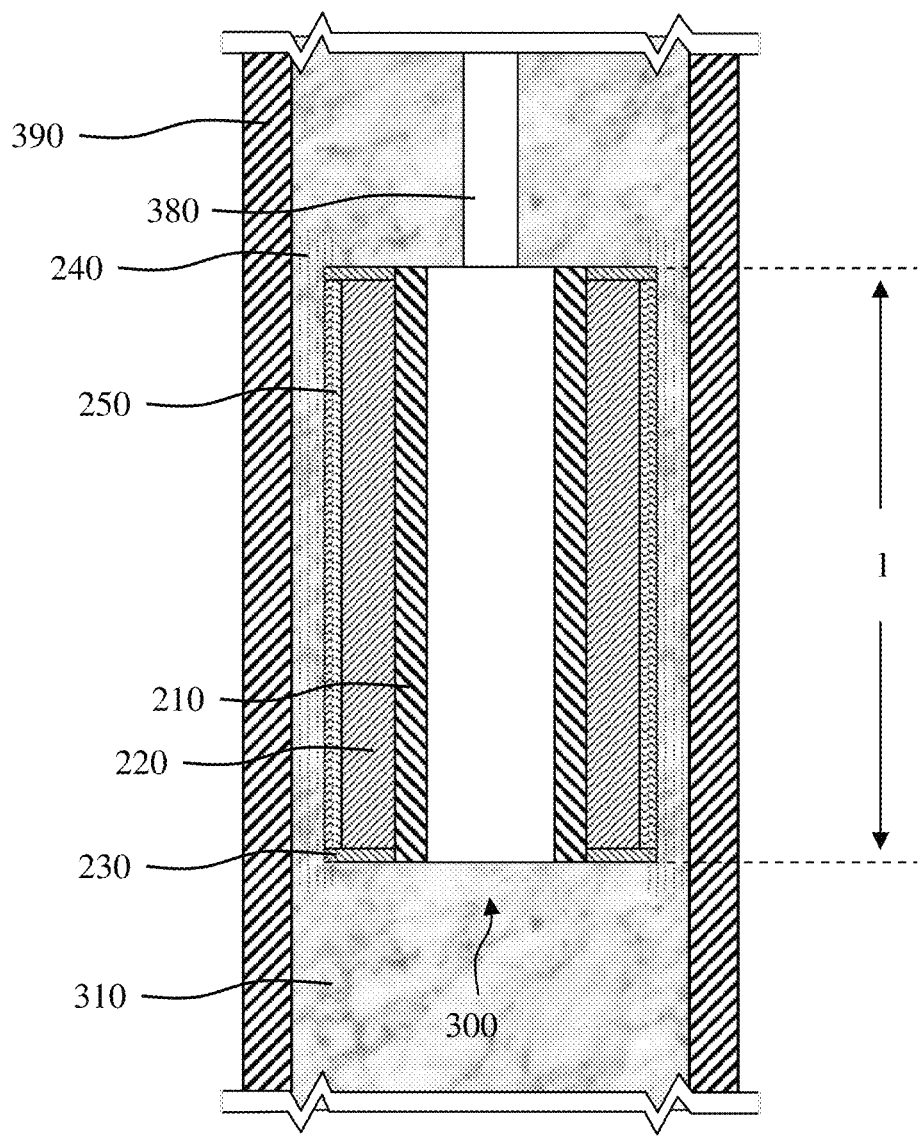
Figure 3C:
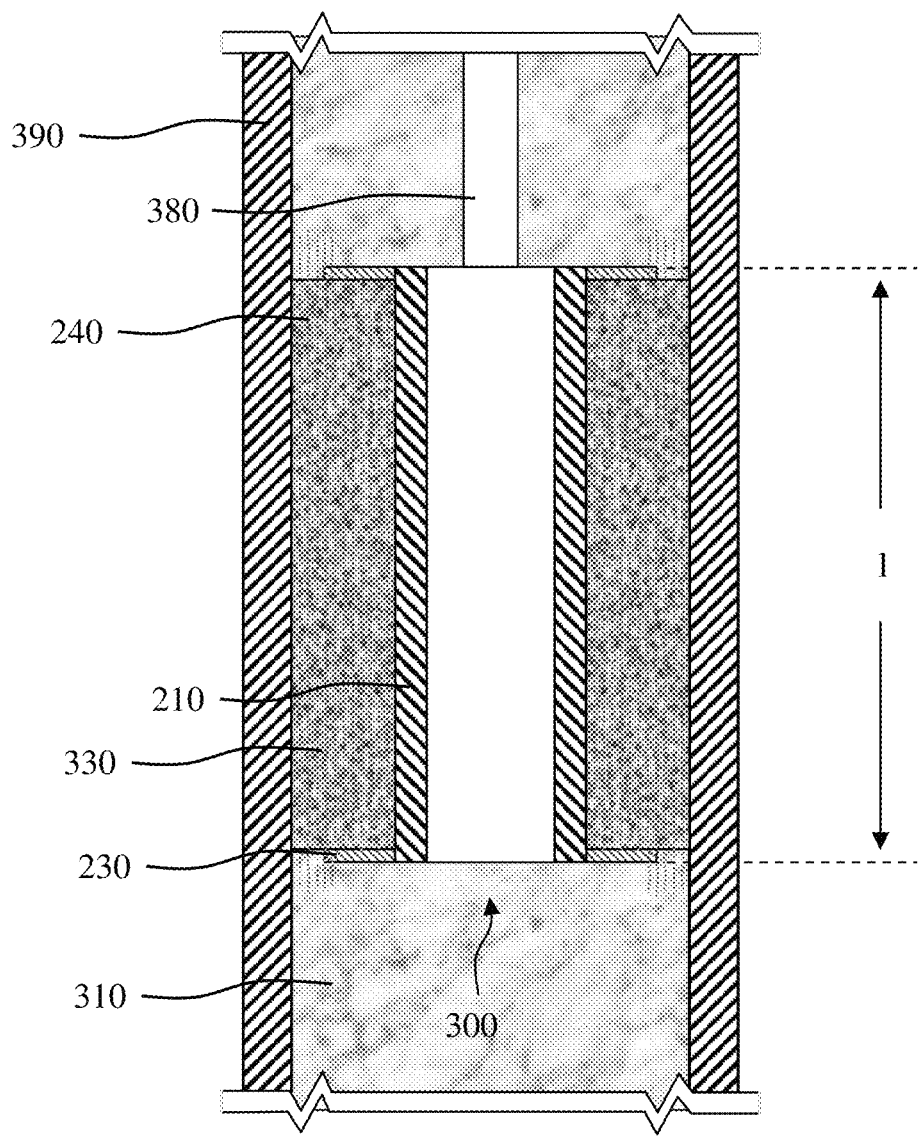

Turning now to FIGS. 3A through 3C, illustrated are various different views of a downhole tool 300 designed, manufactured and/or operated according to one or more embodiments of the disclosure coupled to a conveyance 380 and deployed within a wellbore tubular 390. The downhole tool 300 is similar in many respects to the downhole tool 200 of FIG. 2. Accordingly, like reference numbers have been used to indicate similar, if not identical, features.

The conveyance 380 may be any known or hereafter discovered conveyance and remain within the scope of the disclosure. The wellbore tubular 390 may also be any known or hereafter discovered wellbore tubular and remain within the scope of the disclosure. In at least one embodiment, however, the wellbore tubular 390 is wellbore casing or an uncased section of a wellbore.

In the embodiment of FIG. 3A, the dissolvable sleeve 260 remains intact, and thus keeps the colloidal particles (e.g., the non-reactive colloidal dispersion of colloid particles 250) proximate the expandable metal member 220. The dissolvable sleeve 260, may additionally keep any potentially reactive fluids from reaching the expandable metal member 220. However, in the embodiment of FIG. 3A, no reactive fluid is surrounding the downhole tool 300.

Turning to FIG. 3B, illustrated is the downhole tool 300 of FIG. 3A after the downhole tool 300 has been subjected to fluid (e.g., reactive fluid 310 in one embodiment). The reactive fluid 310, over time, may dissolve the dissolvable sleeve 260. When the dissolvable sleeve 260 dissolves, colloid particles 240 from the non-reactive colloidal dispersion of colloid particles 250 may disperse within the reactive fluid 310 surrounding the downhole tool 300, as shown.

Turning to FIG. 3C, illustrated is the downhole tool 300 of FIG. 3B after the reactive fluid 310 having the colloid particles 240 therein reacts with the expandable metal member 220. The reactive fluid 310, in the illustrated embodiment, causes the expandable metal member 220 to expand in response to hydrolysis, and thereby form an expanded metal member 330. In accordance with the disclosure, given that the reactive fluid 310 now includes the colloid particles 240, the expanded metal member 330 includes the colloid particles 240 in interstitial spaces thereof. Accordingly, the expanded metal member 330 having the colloid particles 240 is more impervious to fluid and/or gas migration therethrough, as compared to a traditional expanded metal member.

Figure 4:
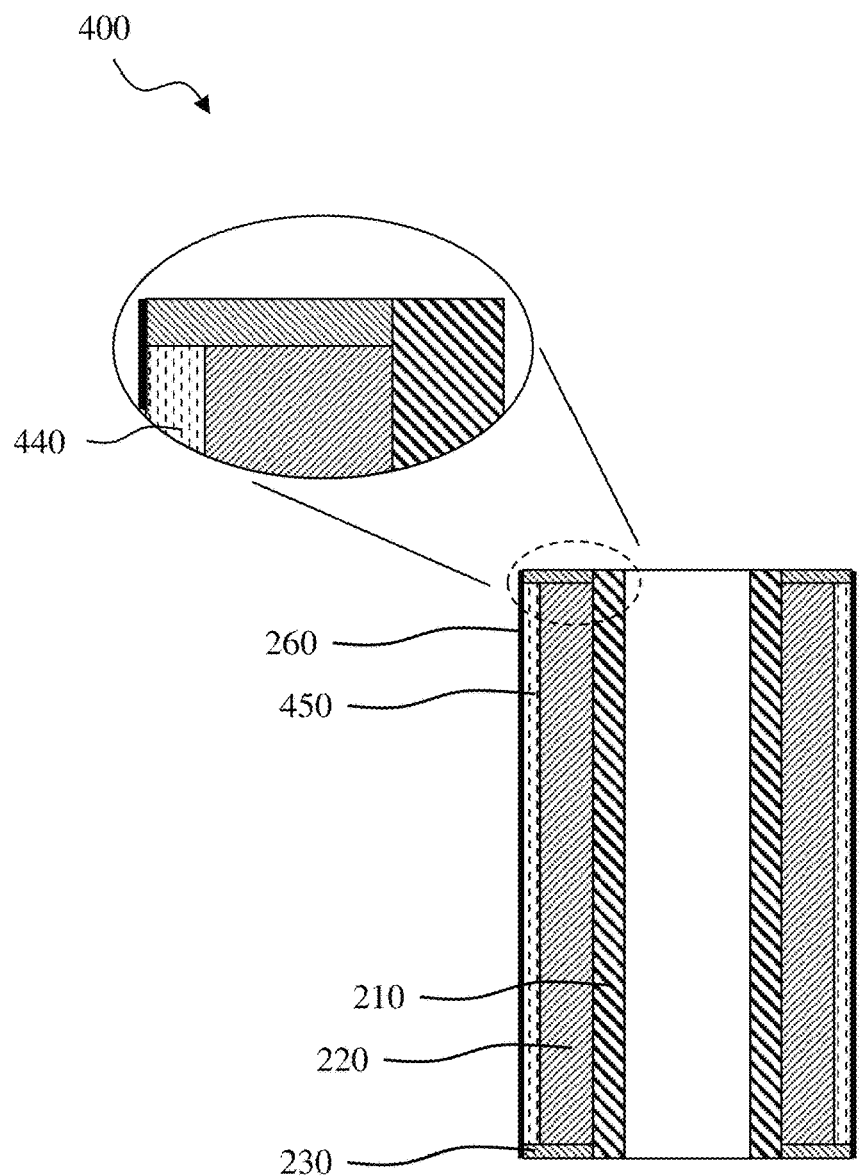
FIG. 4 illustrates an alternative embodiment of a downhole tool designed, manufactured and/or operated according to one or more embodiments of the disclosure.

Turning now to FIG. 4, illustrated is an alternative embodiment of a downhole tool 400 designed, manufactured and/or operated according to one or more embodiments of the disclosure. The downhole tool 400 is similar in many respects to the downhole tool 200 of FIG. 2. Accordingly, like reference numbers have been used to indicate similar, if not identical, features. The downhole tool 400 differs, for the most part, from the downhole tool 200, in that the downhole tool 400 employs colloid particles 440 in the form of a powder of colloidal particles 450, as opposed to the non-reactive colloidal dispersion of colloid particles 250 discussed with regard to FIG. 2.

Figure 5A:
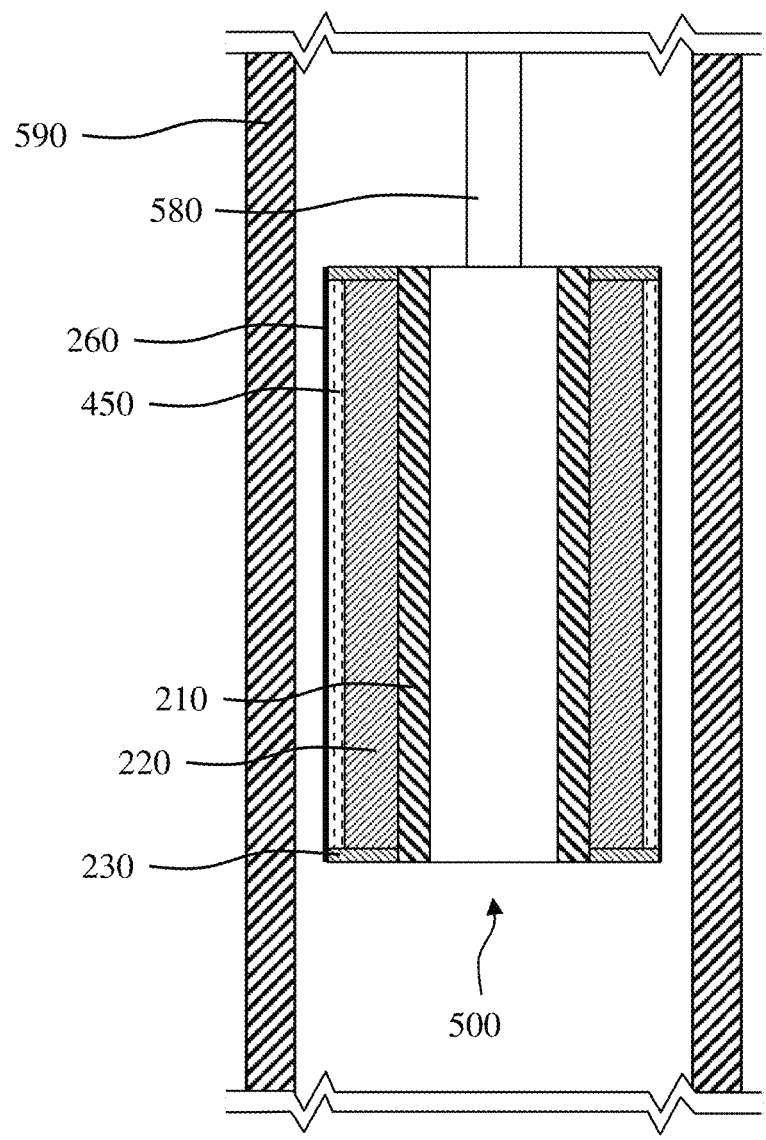
FIGS. 5A through 5C illustrate various different views of a downhole tool designed, manufactured and/or operated according to one or more embodiments of the disclosure coupled to a conveyance and deployed within a wellbore tubular.
Figure 5B:
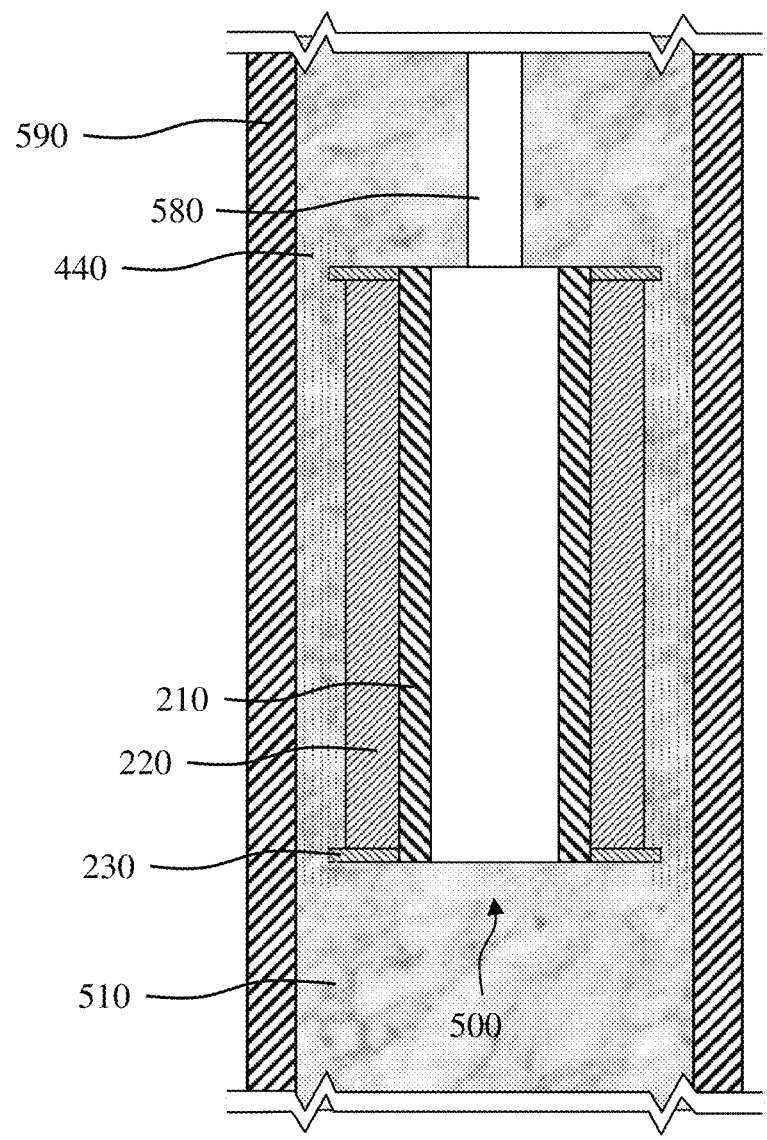
Figure 5C:
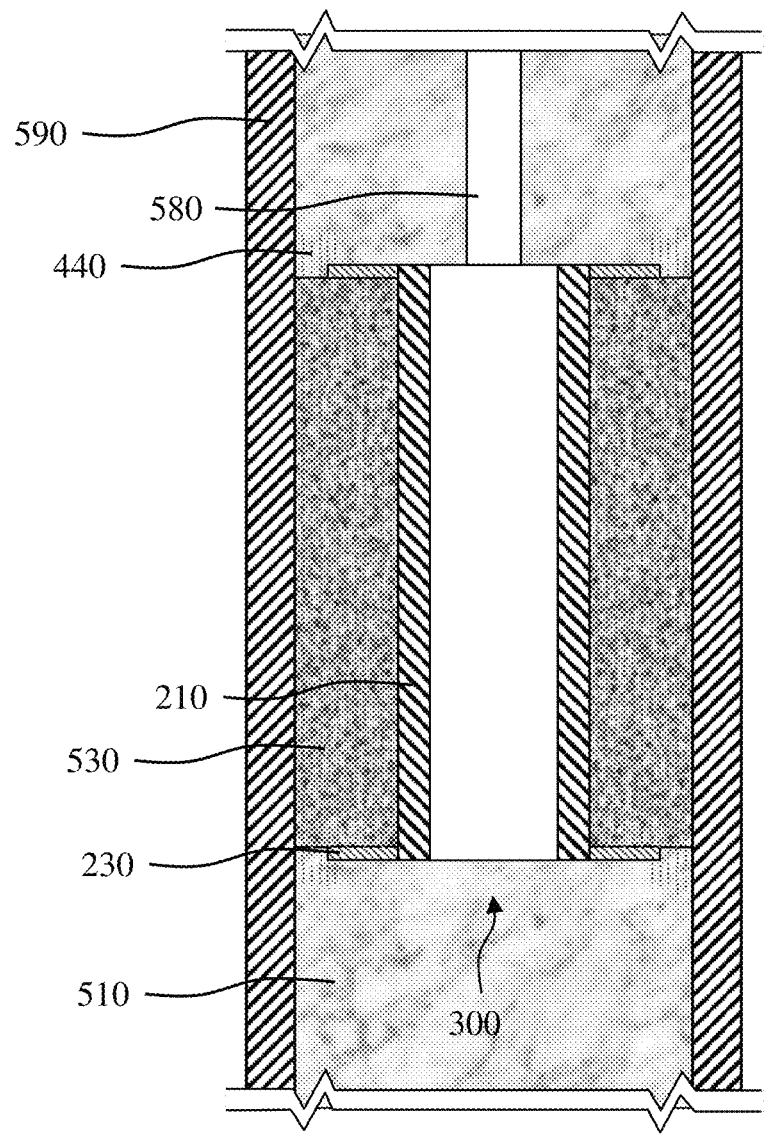

Turning now to FIGS. 5A through 5C, illustrated are various different views of a downhole tool 500 designed, manufactured and/or operated according to one or more embodiments of the disclosure coupled to a conveyance 580 and deployed within a wellbore tubular 590. The downhole tool 500 is similar in many respects to the downhole tool 400 of FIG. 4. Accordingly, like reference numbers have been used to indicate similar, if not identical, features.

Turning to FIG. 5A, the dissolvable sleeve 260 remains intact, and thus keeps the powder of colloid particles 450 proximate the expandable metal member 220. The dissolvable sleeve 260, may additionally keep any potentially reactive fluids from reaching the expandable metal member 220.

Turning to FIG. 5B, illustrated is the downhole tool 500 of FIG. 5A after the downhole tool 500 has been subjected to fluid (e.g., reactive fluid 510 in one embodiment). The reactive fluid 510, over time, may dissolve the dissolvable sleeve 260. When the dissolvable sleeve 260 dissolves, the colloid particles from the powder of colloid particles 450 may disperse within the reactive fluid 510 surrounding the downhole tool 500, as shown.

Turning to FIG. 5C, illustrated is the downhole tool 500 of FIG. 5B after the reactive fluid 510 having the colloid particles 440 therein reacts with the expandable metal member 220. The reactive fluid 510, in the illustrated embodiment, causes the expandable metal member 220 to expand in response to hydrolysis, and thereby form an expanded metal member 530. In accordance with the disclosure, given that the reactive fluid 510 now includes the colloid particles 440, the expanded metal member 530 includes the colloid particles 440 in interstitial spaces thereof.

Figure 6:
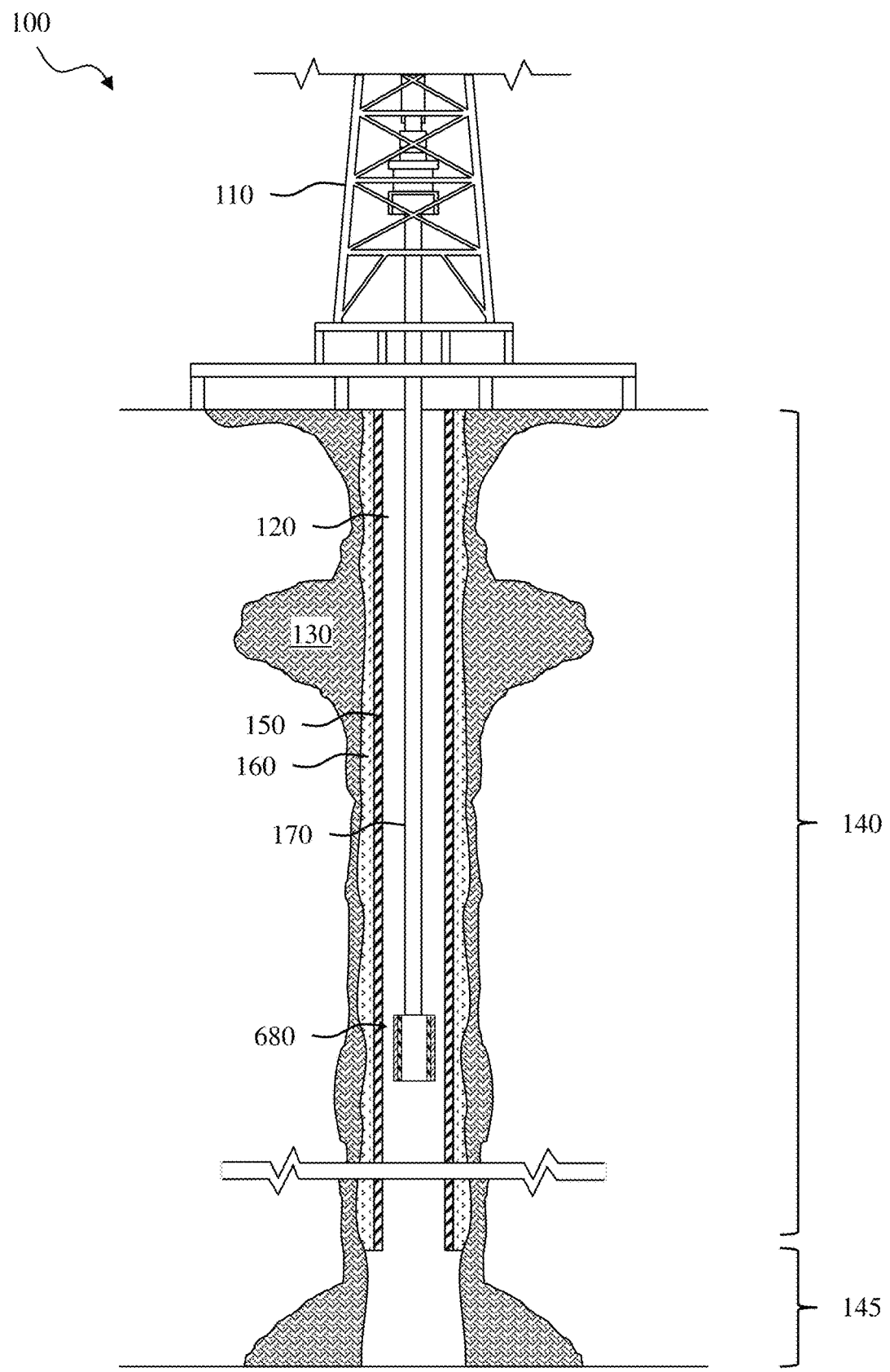
FIG. 6 illustrates a well system designed, manufactured and/or operated according to one or more alternative embodiments of the disclosure.

Turning to FIGS. 6, illustrated is a well system 600 designed, manufactured and/or operated according to one or more alternative embodiments of the disclosure. The well system 600 is similar in many respects to the well system 100 of FIG. 1. Accordingly, like reference numbers have been used to indicate similar, if not identical, features. The well system 600 differs, for the most part, from the well system 100, in that the well system 600 employs a different downhole tool 680. For instance, wherein the downhole tool 180 itself includes the colloid particles surrounding a surface of the expandable metal member, the downhole tool 680 does not.

Figure 7:
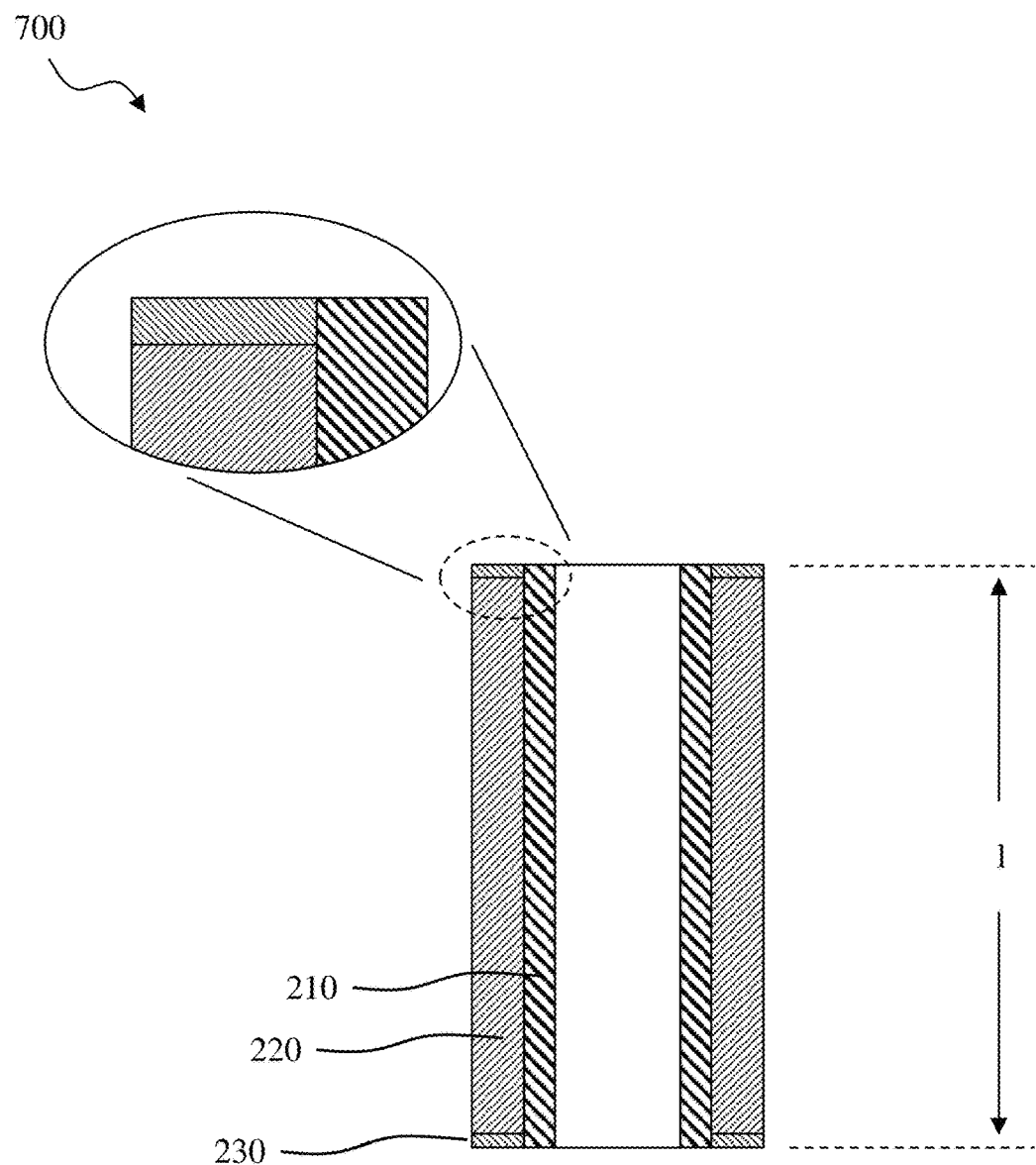
FIG. 7 illustrates one embodiment of a downhole tool designed, manufactured and/or operated according to one or more embodiments of the disclosure, as might be used in a well system such as the well system of FIG. 6.

Turning to FIG. 7, illustrated is one embodiment of a downhole tool 700 designed, manufactured and/or operated according to one or more embodiments of the disclosure, as might be used in a well system such as the well system 600 of FIG. 6. The downhole tool 700 of FIG. 7, in one or more embodiments, is similar to the downhole tool 200 of FIG. 2. Accordingly, like reference numbers have been used to indicated similar, if not identical, features. The downhole tool 700 differs, for the most part, from the downhole tool 200, in that the downhole tool 700 itself does not include colloid particles surrounding a surface of the expandable metal member. Furthermore, the dissolvable sleeve 260 of the embodiment of FIG. 2 is thus not necessary. As will be understood below, the colloid particles will be introduced near the expandable metal member 220 using fluid within the wellbore.

Turning now to FIGS. 8A through 8F, illustrated are various different views of a well system 800 and downhole tool 880 designed, manufactured and/or operated according to one or more embodiments of the disclosure at different stages of deployment. The well system 800 of FIGS. 8A through 8F is similar, in many respects, to the well system 700 of FIG. 7. Furthermore, the downhole tool 880 of FIGS. 8A through 8F is similar, in many respects, to the downhole tool 700 of FIG. 7. Accordingly, like reference numbers have been used to indicate similar, if not identical, features.

Figure 8A:
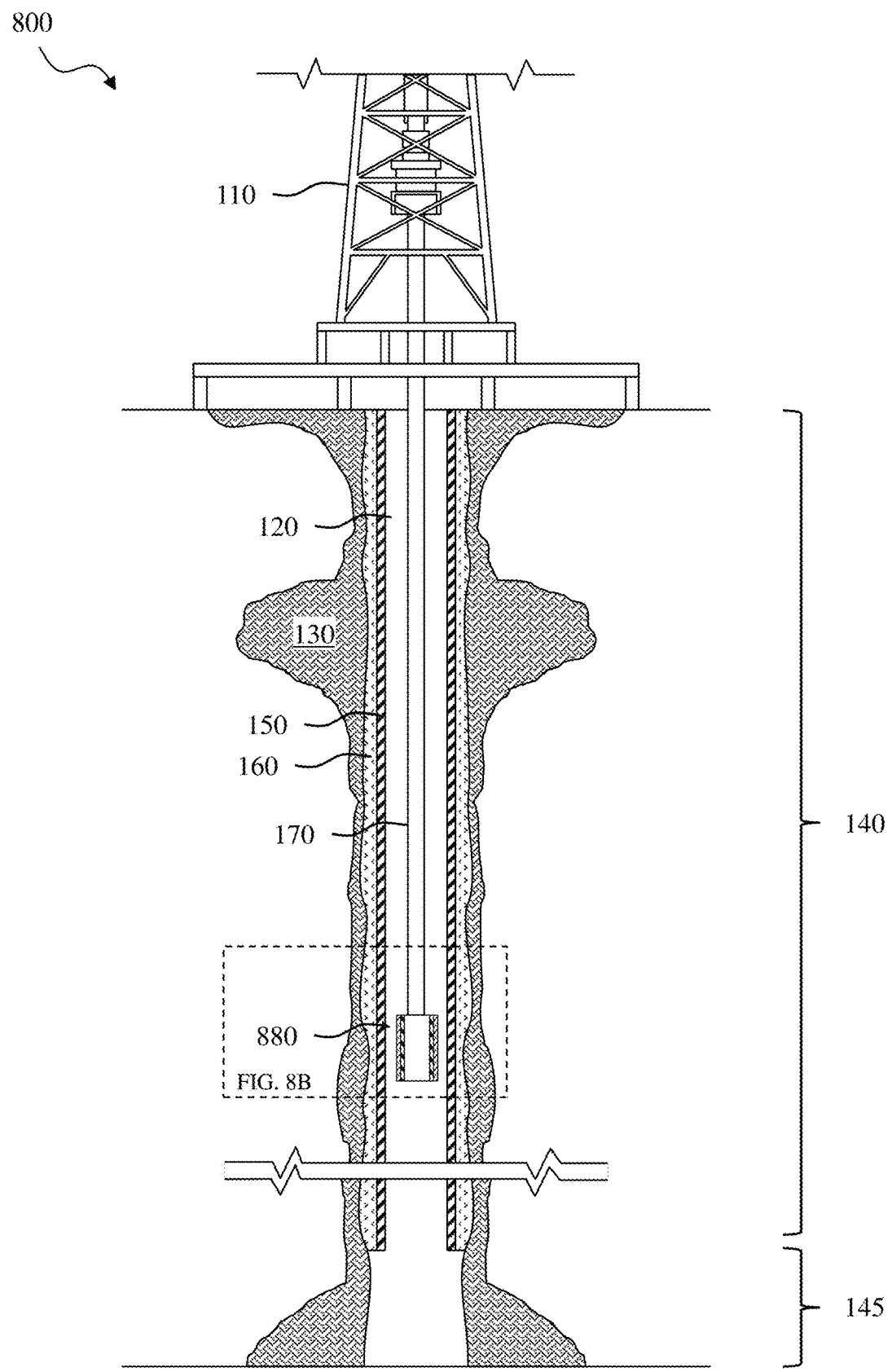
Figure 8B:
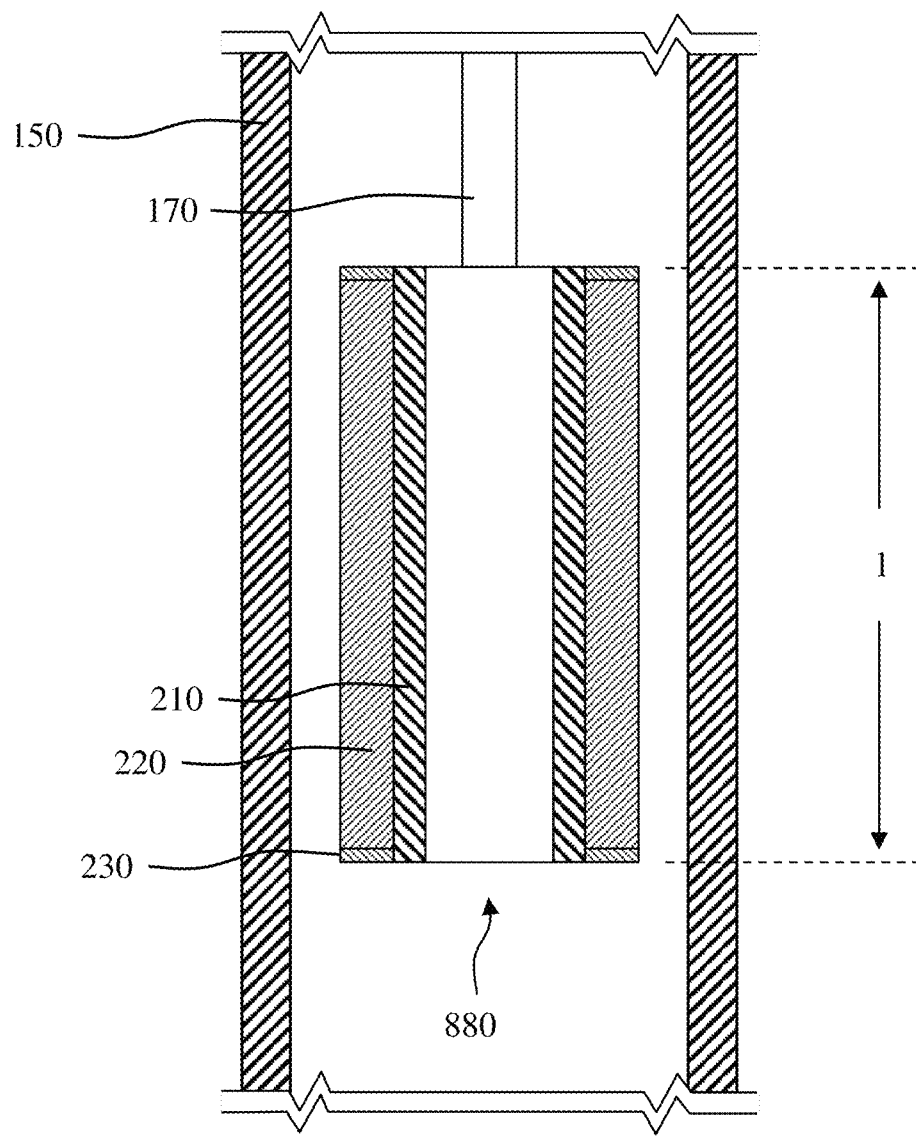

Turning initially to FIGS. 8A and 8B, the downhole tool 880 is located within the wellbore 120 in a run-in-hole state. Further to the embodiment of FIGS. 8A and 8B, reactive fluid has yet to be located within the wellbore 120 and surrounding the downhole tool 880, and thus the expandable metal member 220 has yet to expand in response to hydrolysis. While the embodiment of FIGS. 8A and 8B illustrates that the wellbore 120 is free of any fluid, other embodiments may exist wherein the downhole tool 880 is surrounding by non-reactive fluid (e.g., oil based mud, etc.).

Figure 8C:
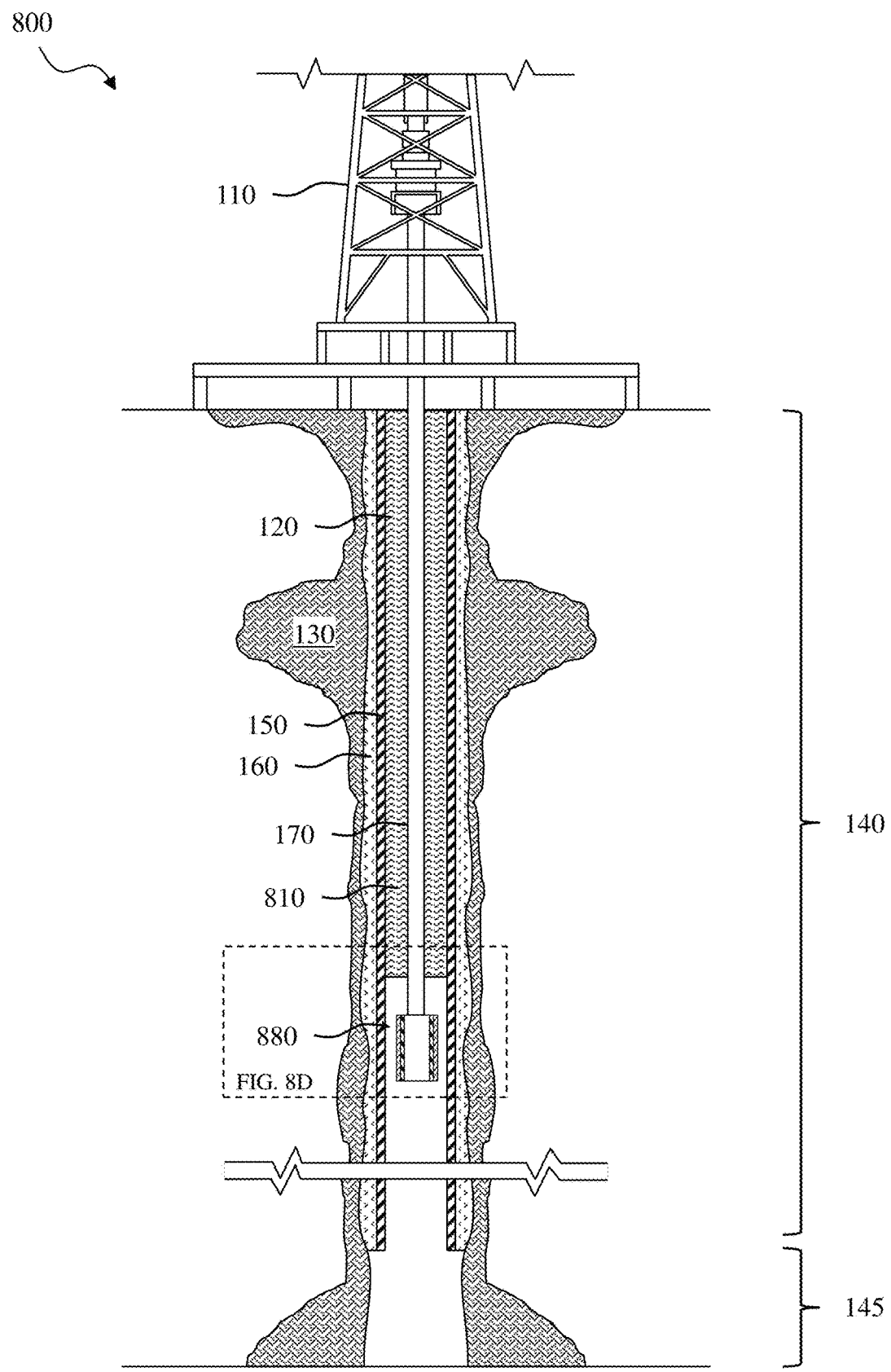
Figure 8D:
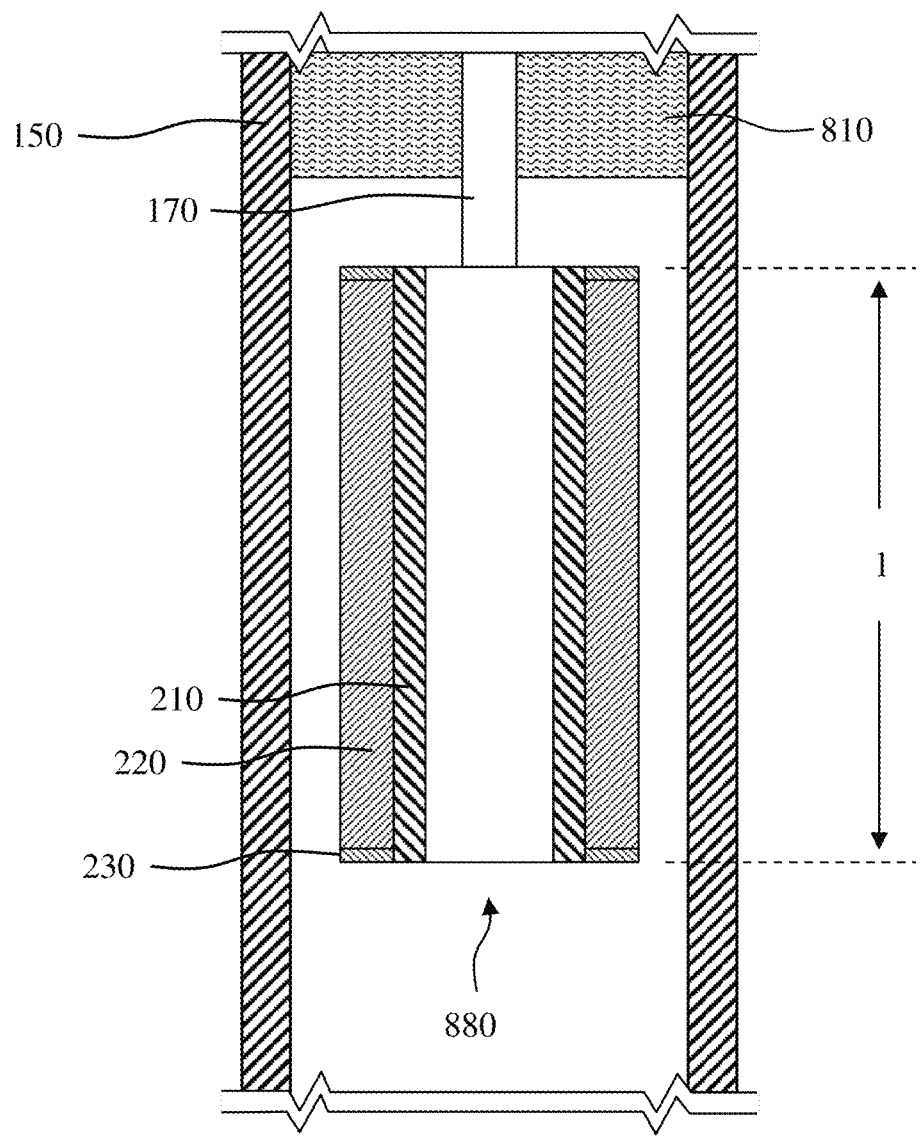

Turning now to FIGS. 8C and 8D, illustrated are the well system 800 and downhole tool 880 of FIGS. 8A and 8B, after a reactive colloidal dispersion of colloid particles 810 (e.g., as described above) is starting to fill the wellbore 120, but has yet to reach the downhole tool 880. As reactive fluid (e.g., the reactive colloidal dispersion of colloid particles 810) has yet to reach the downhole tool 880, the expandable metal member 220 has again yet to expand in response to hydrolysis.

Figure 8E:
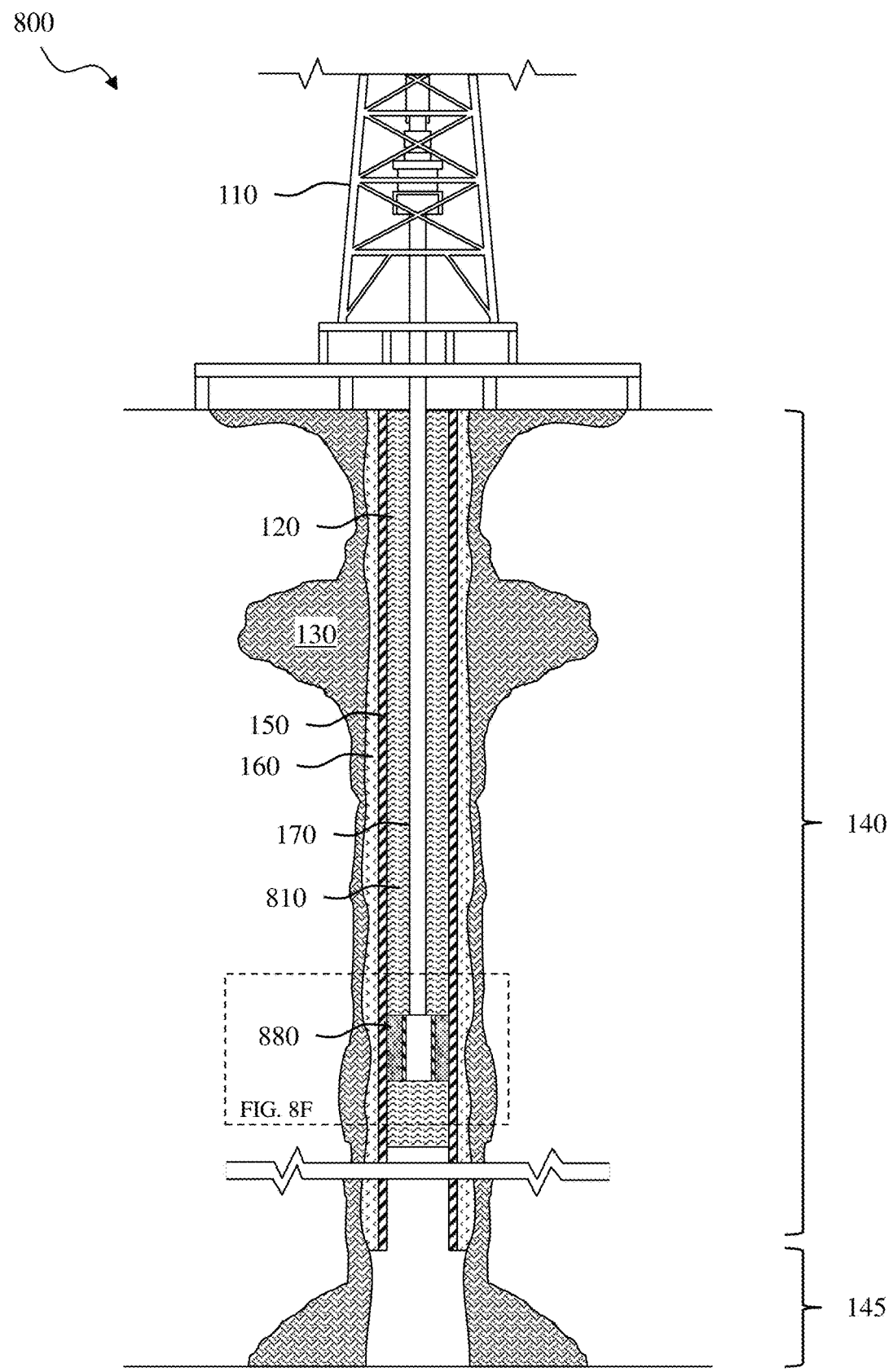
Figure 8F:
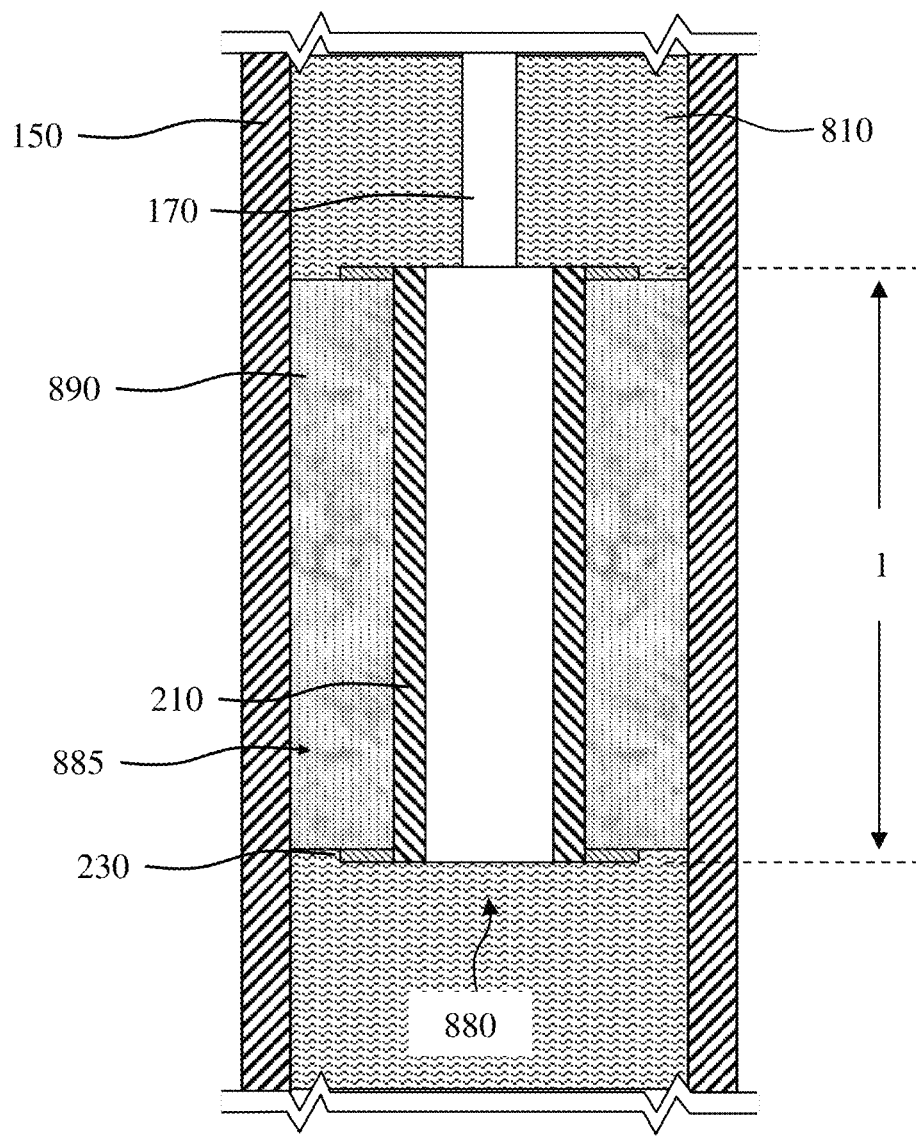

Turning now to FIGS. 8E and 8F, illustrated are the well system 800 and downhole tool 880 of FIGS. 8C and 8D, after the reactive colloidal dispersion of colloid particles 810 has filled the wellbore at least past the downhole tool 880. Accordingly, at this stage the downhole tool 880, and more particularly the expandable metal member 220, is in contact with the reactive colloidal dispersion of colloid particles 810. The reactive fluid within the reactive colloidal dispersion of colloid particles 810 causes the expandable metal member 220 to expand in response to hydrolysis, and thereby form an expanded metal member 885. In accordance with the disclosure, given that the reactive colloidal dispersion of colloid particles 810 includes the colloid particles, the expanded metal member 885 benefits from the inclusion of the colloid particles 890 in interstitial spaces thereof. Accordingly, the expanded metal member 885 having the colloid particles 890 is more impervious to fluid and/or gas migration therethrough, as compared to a traditional expanded metal member.

Turning now to FIGS. 9A through 9J, illustrated are various different views of a well system 900 and downhole tool 980 designed, manufactured and/or operated according to one or more embodiments of the disclosure at different stages of deployment. The well system 900 of FIGS. 9A through 9J is similar, in many respects, to the well system 700 of FIG. 7. Furthermore, the downhole tool 980 of FIGS. 9A through 9J is similar, in many respects, to the downhole tool 700 of FIG. 7. Accordingly, like reference numbers have been used to indicate similar, if not identical, features.

Figure 9A:
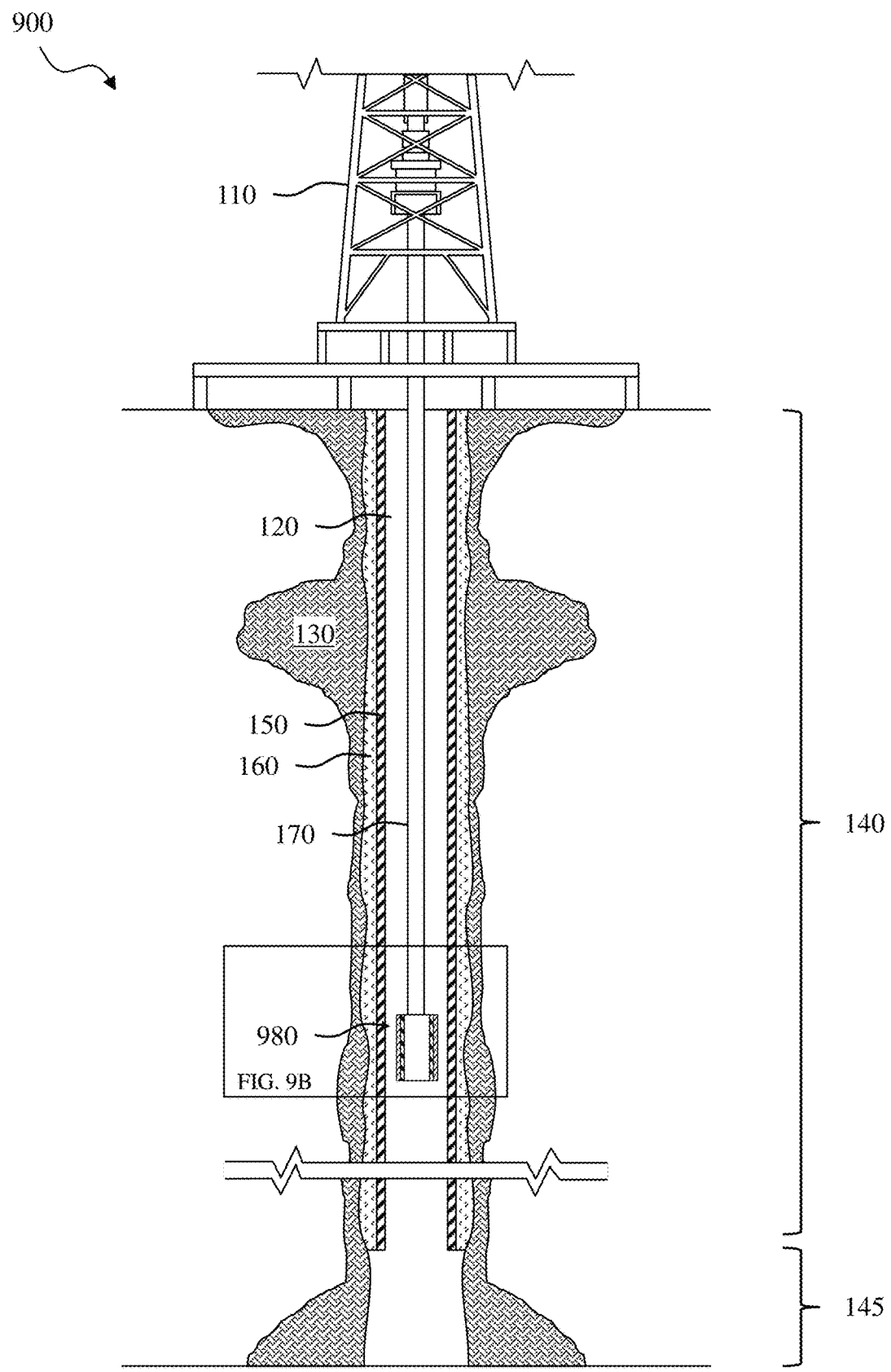
Figure 9B:
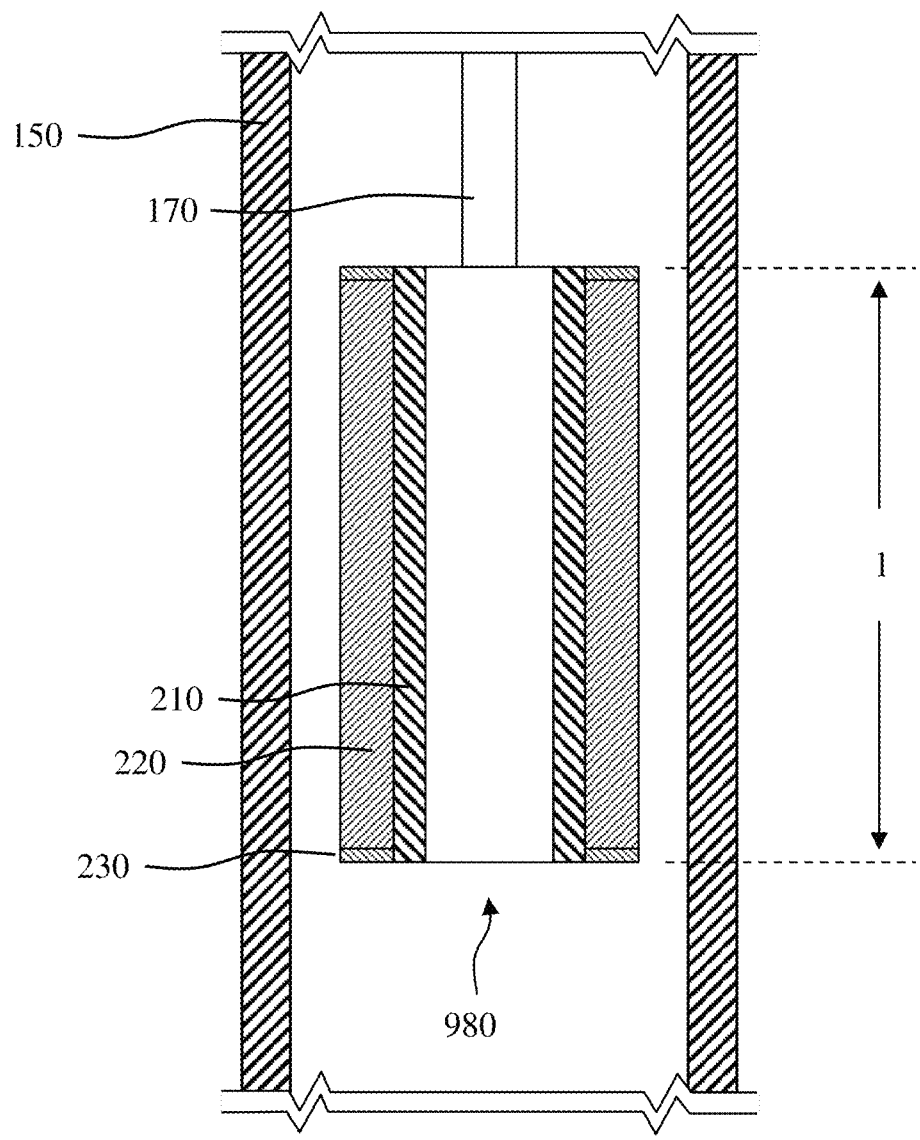

Turning initially to FIGS. 9A and 9B, the downhole tool 980 is located within the wellbore 120 in a run-in-hole state. Further to the embodiment of FIGS. 9A and 9B, reactive fluid has yet to be located within the wellbore 120 and surrounding the downhole tool 980, and thus the expandable metal member 220 has yet to expand in response to hydrolysis. While the embodiment of FIGS. 9A and 9B illustrates that the wellbore 120 is free of any fluid, other embodiments may exist wherein the downhole tool 980 is surrounding by non-reactive fluid (e.g., oil based mud, etc.).

Figure 9C:
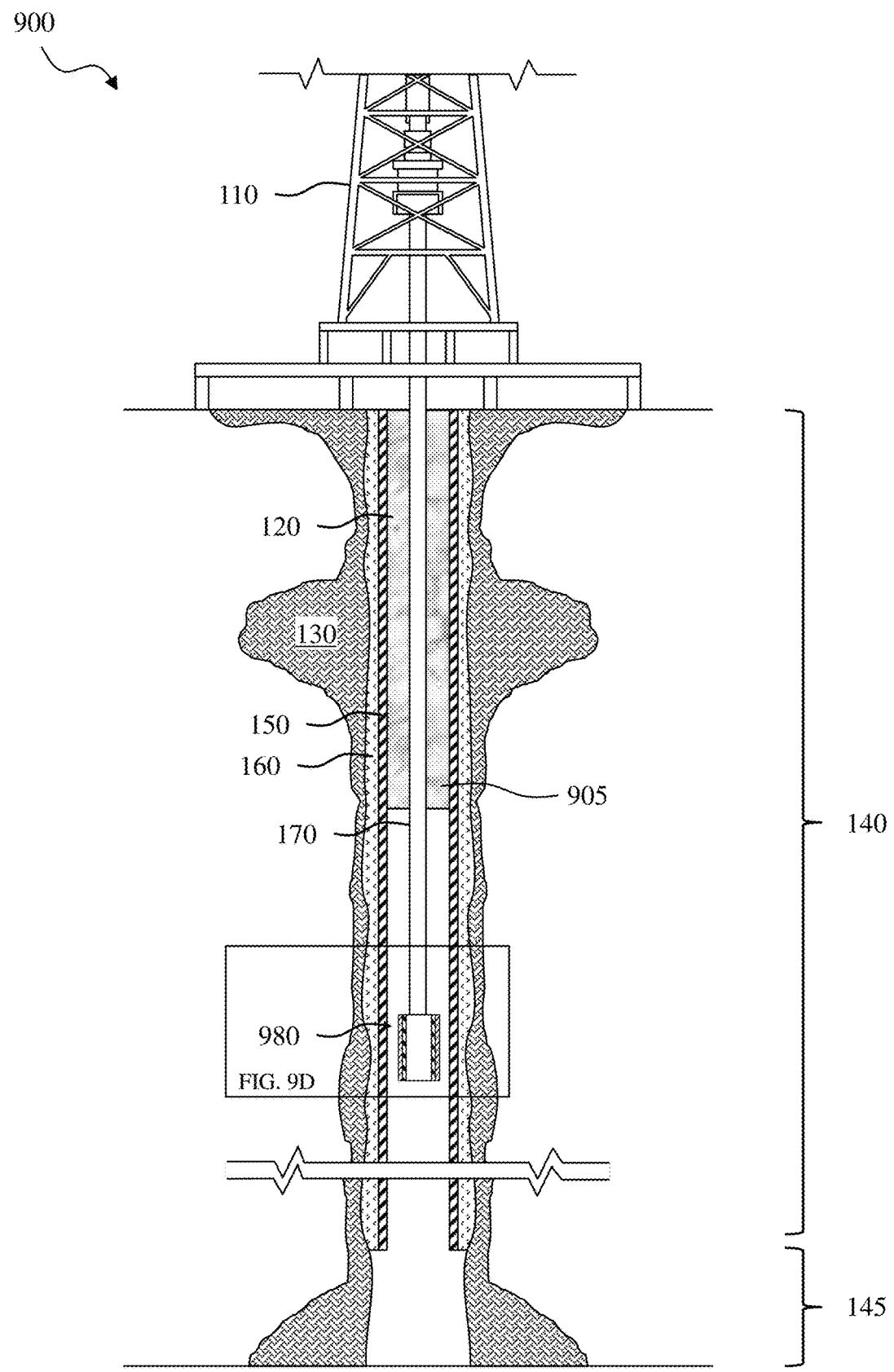
Figure 9D:
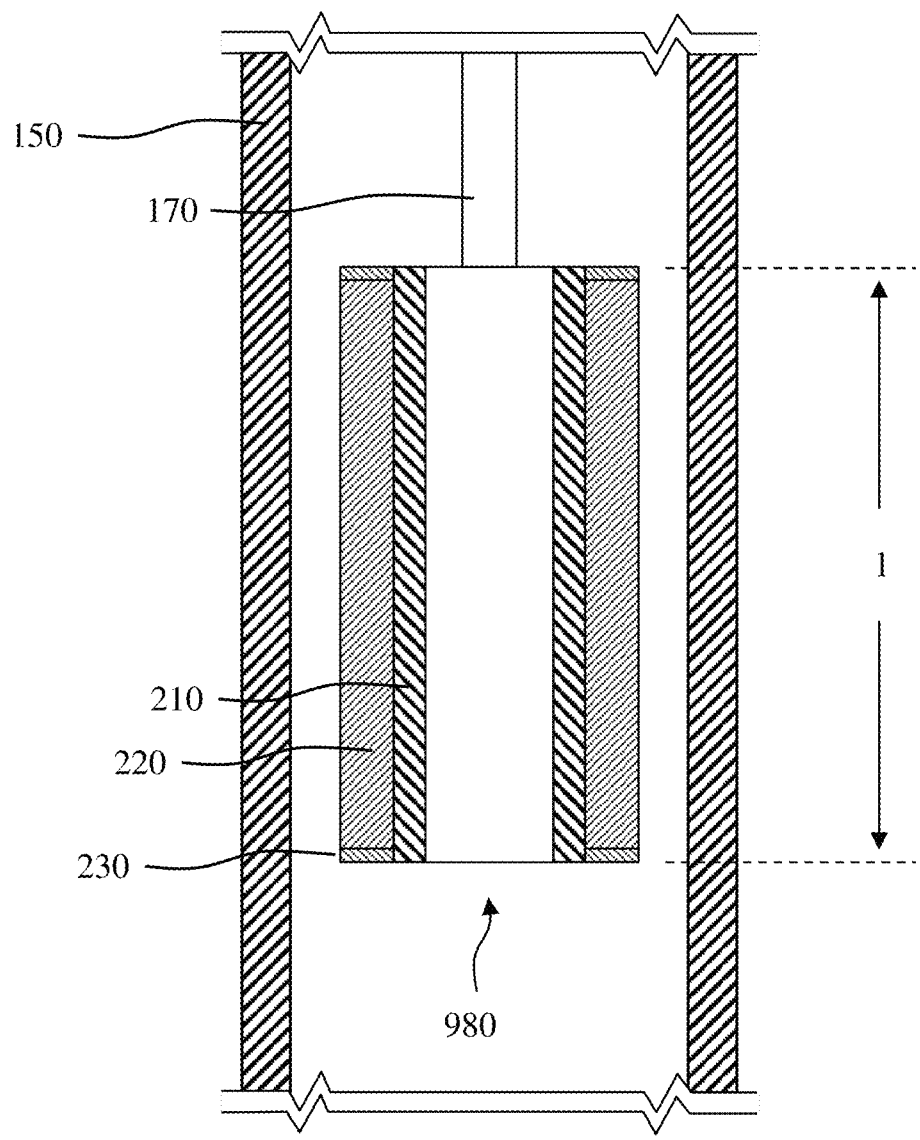

Turning now to FIGS. 9C and 9D, illustrated are the well system 900 and downhole tool 980 of FIGS. 9A and 9B, after non-reactive fluid 905 is starting to fill the wellbore 120, but has yet to reach the downhole tool 880. As reactive fluid has yet to reach the downhole tool 980, the expandable metal member 220 has again yet to expand in response to hydrolysis. Furthermore, the non-reactive fluid 905 may or may not include the colloid particles. Nevertheless, in the embodiment of FIGS. 9C and 9D, the non-reactive fluid 905 does not include the colloid particles.

Figure 9E:
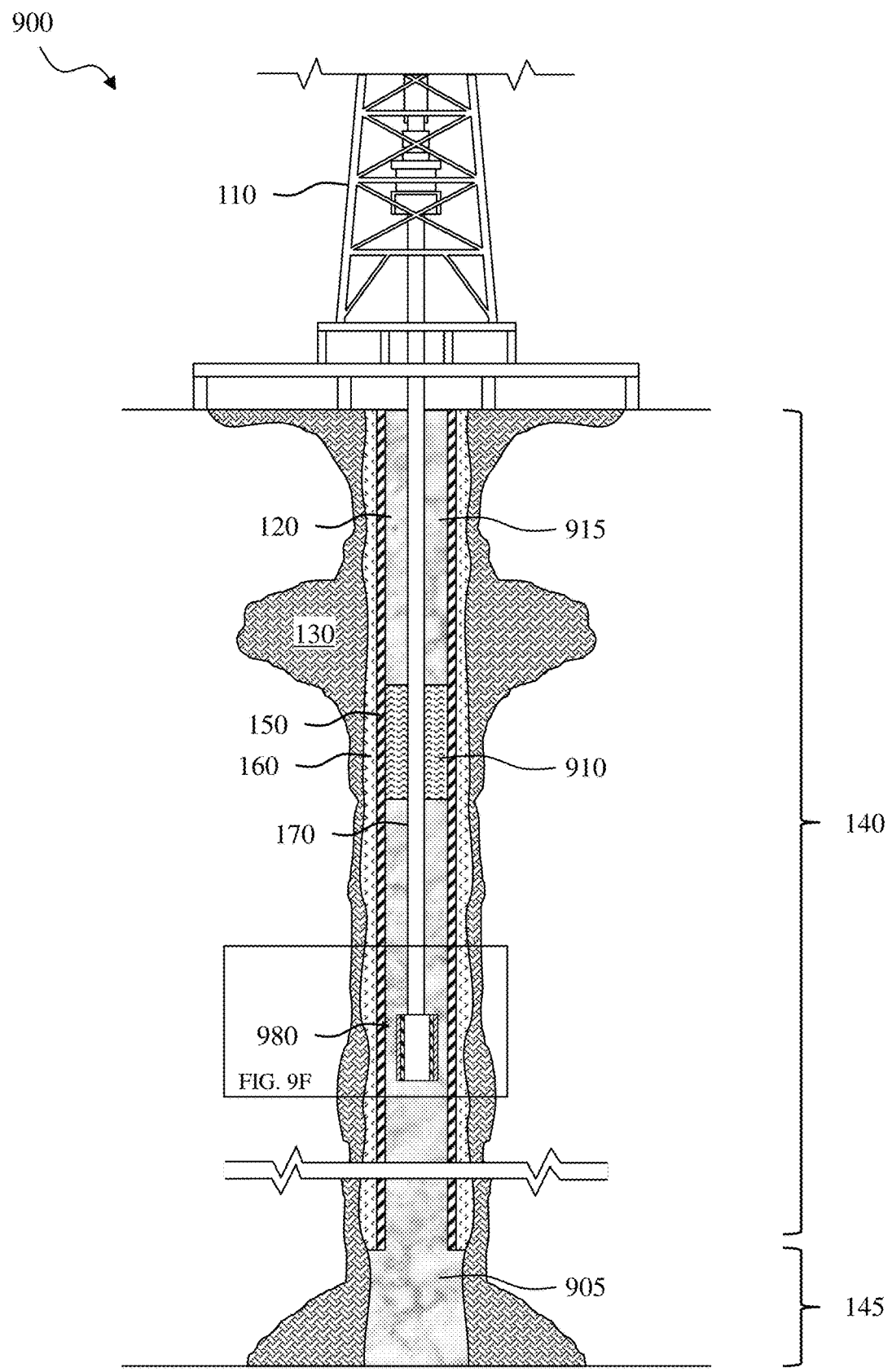
Figure 9F:
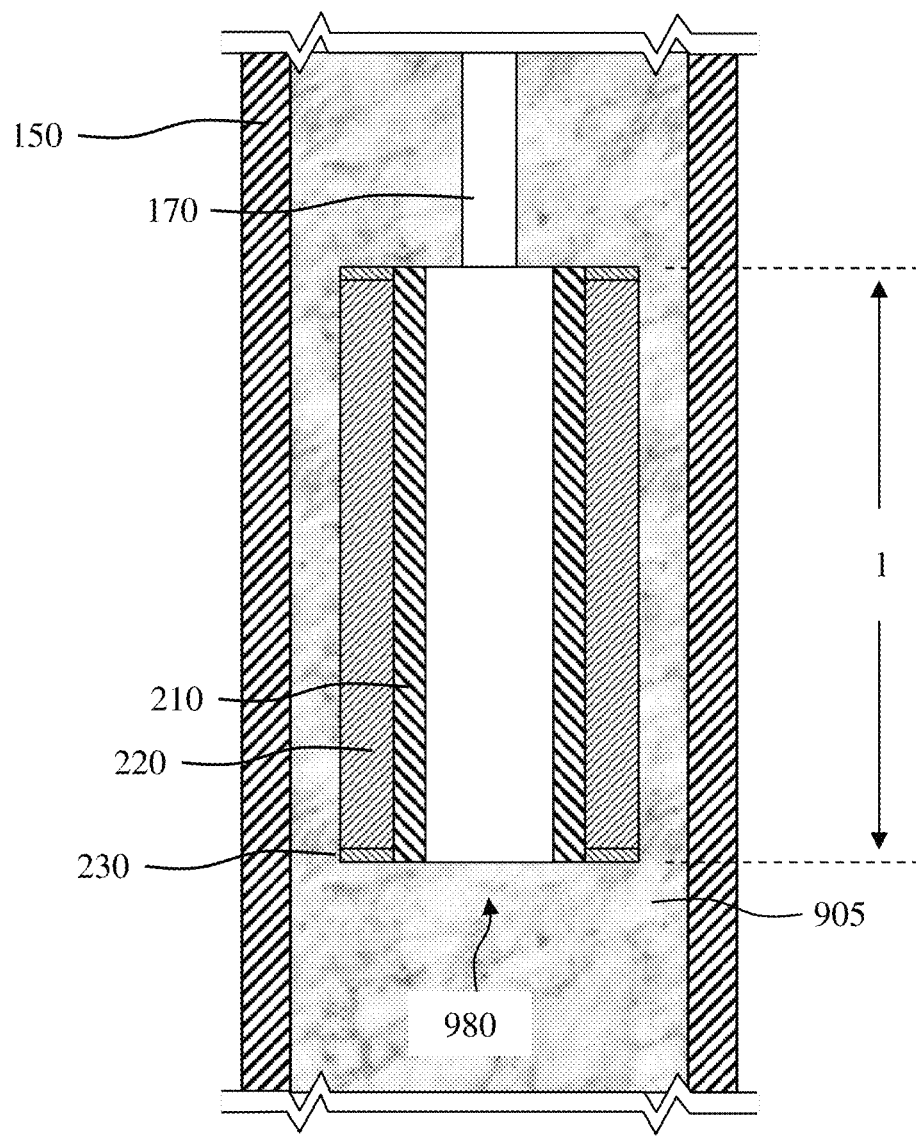

Turning now to FIGS. 9E and 9F, illustrated are the well system 900 and downhole tool 980 of FIGS. 9C and 9D, after non-reactive fluid 905 continues to fill the wellbore 120 and has reached the downhole tool 880. Further to the embodiment of FIGS. 9E and 9F, a slug of the reactive colloidal dispersion of colloid particles 910 has been included within the wellbore 120. For example, in the embodiment shown, the slug of the reactive colloidal dispersion of colloid particles 910 is located between the downhole slug of non-reactive fluid 905, and an uphole slug of fluid 915. The uphole slug of fluid 915, in the embodiment of FIGS. 9E and 9F, does not include the colloid particles, and may or may not be a reactive fluid. The uphole slug of fluid 915 also may or may not be a similar fluid as the non-reactive fluid 905.

Figure 9G:
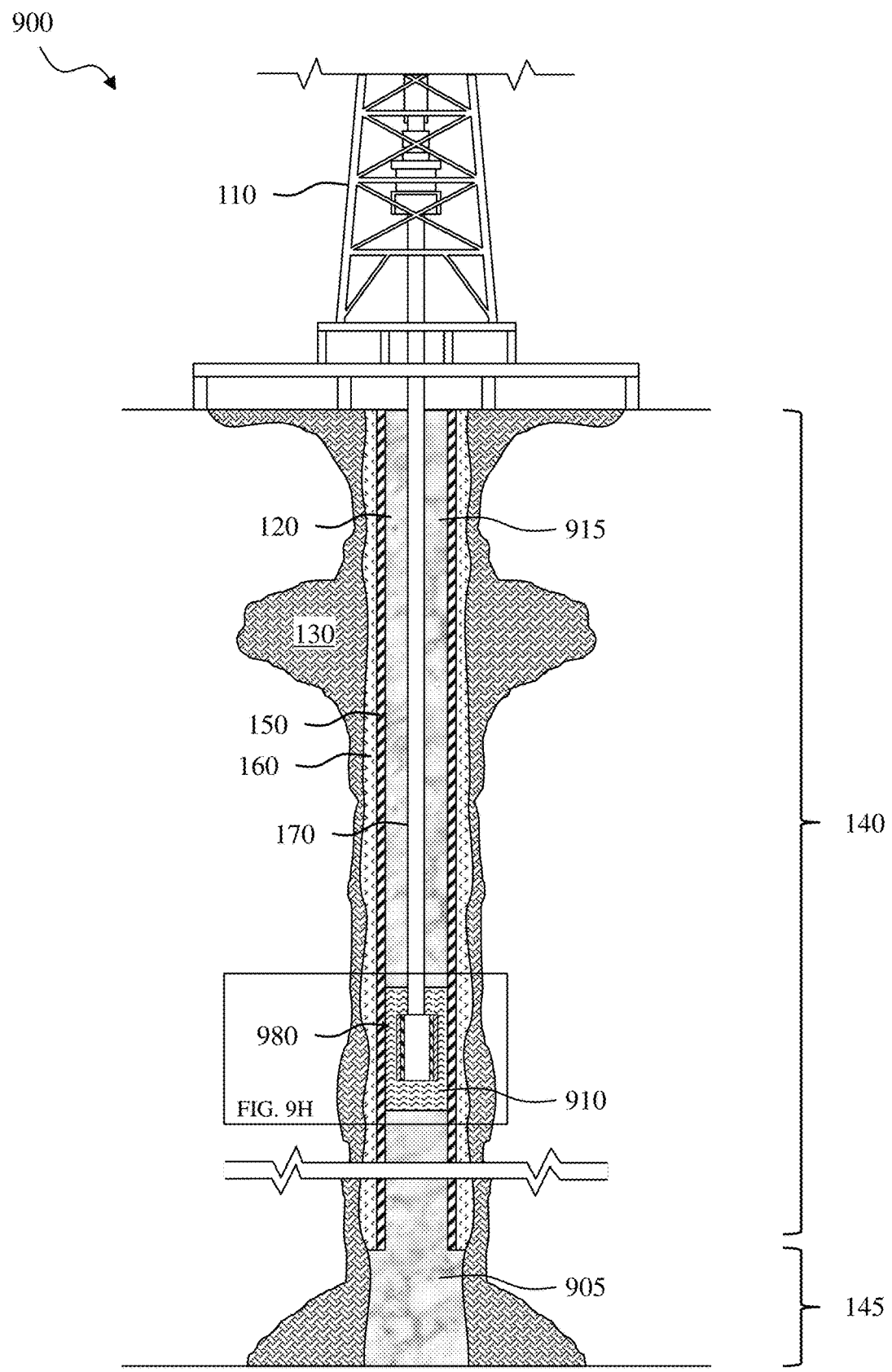
Figure 9H:
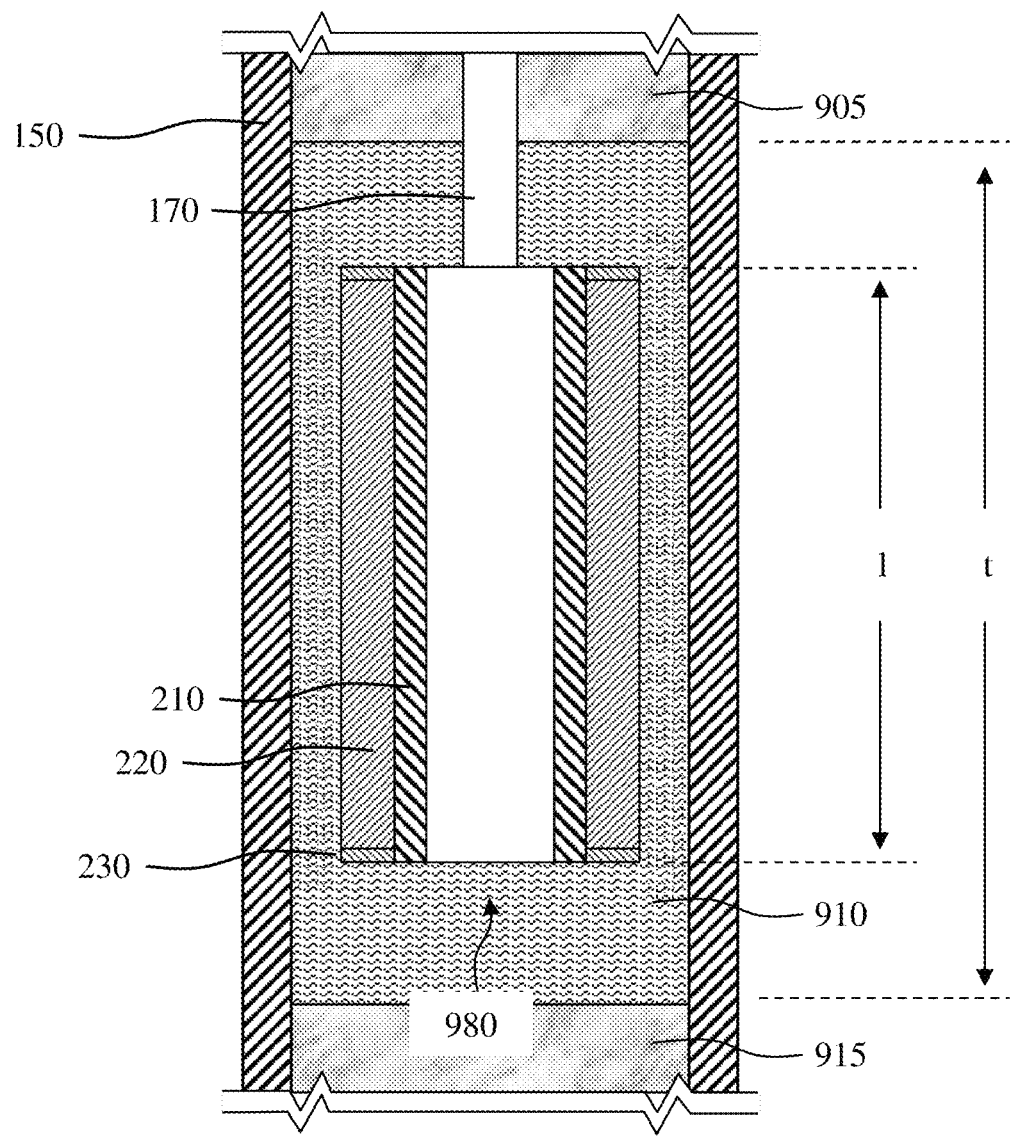

Turning now to FIGS. 9G and 9H, illustrated are the well system 900 and downhole tool 980 of FIGS. 9E and 9F, after the slug of the reactive colloidal dispersion of colloid particles 910 has just reached the downhole tool 980, but has not had enough time to start the hydrolysis process. In at least one embodiment, the downhole tool 980 has a length (l), and the slug of the reactive colloidal dispersion of colloid particles 910 has a thickness (t) greater than the length (l) of the downhole tool 980. In at least one other embodiment, the slug of the reactive colloidal dispersion of colloid particles 910 has a thickness (t) less than 10 times the length (l) of the downhole tool 980. In yet one other embodiment, the slug of the reactive colloidal dispersion of colloid particles 910 has a thickness (t) less than 3 times the length (l) of the downhole tool 980, if not less than 1.5 times the length (l) of the downhole tool 980.

One benefit of using the slug of the reactive colloidal dispersion of colloid particles 910 is that a smaller volume of the colloidal dispersion of colloid particles is required than the embodiment of FIGS. 8A through 8F wherein the entire wellbore 120 down to the expandable metal member 220 is filled with the colloidal dispersion of colloid particles. Thus, doing such may be a great cost savings.

Figure 9I:
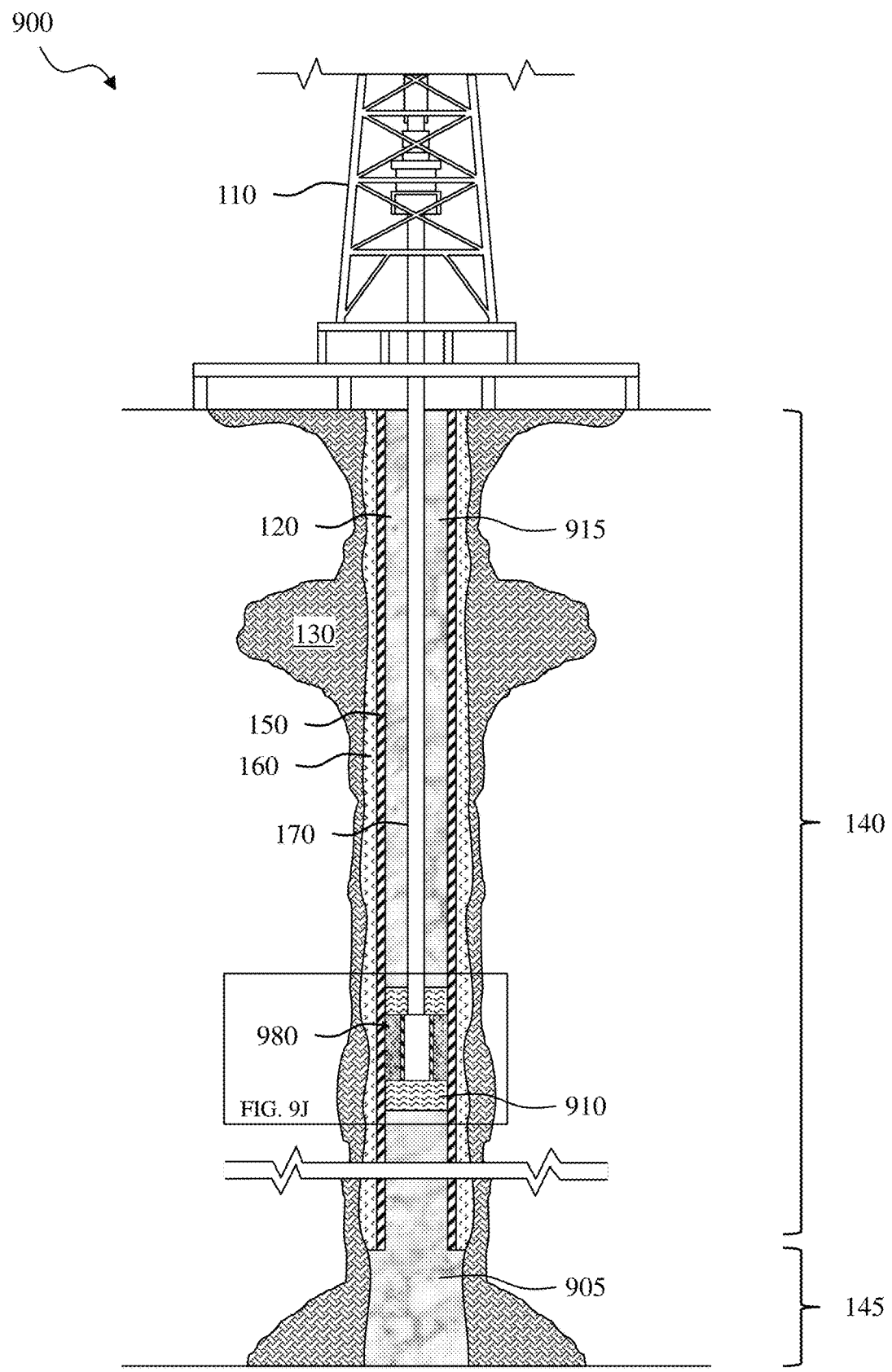
Figure 9J:
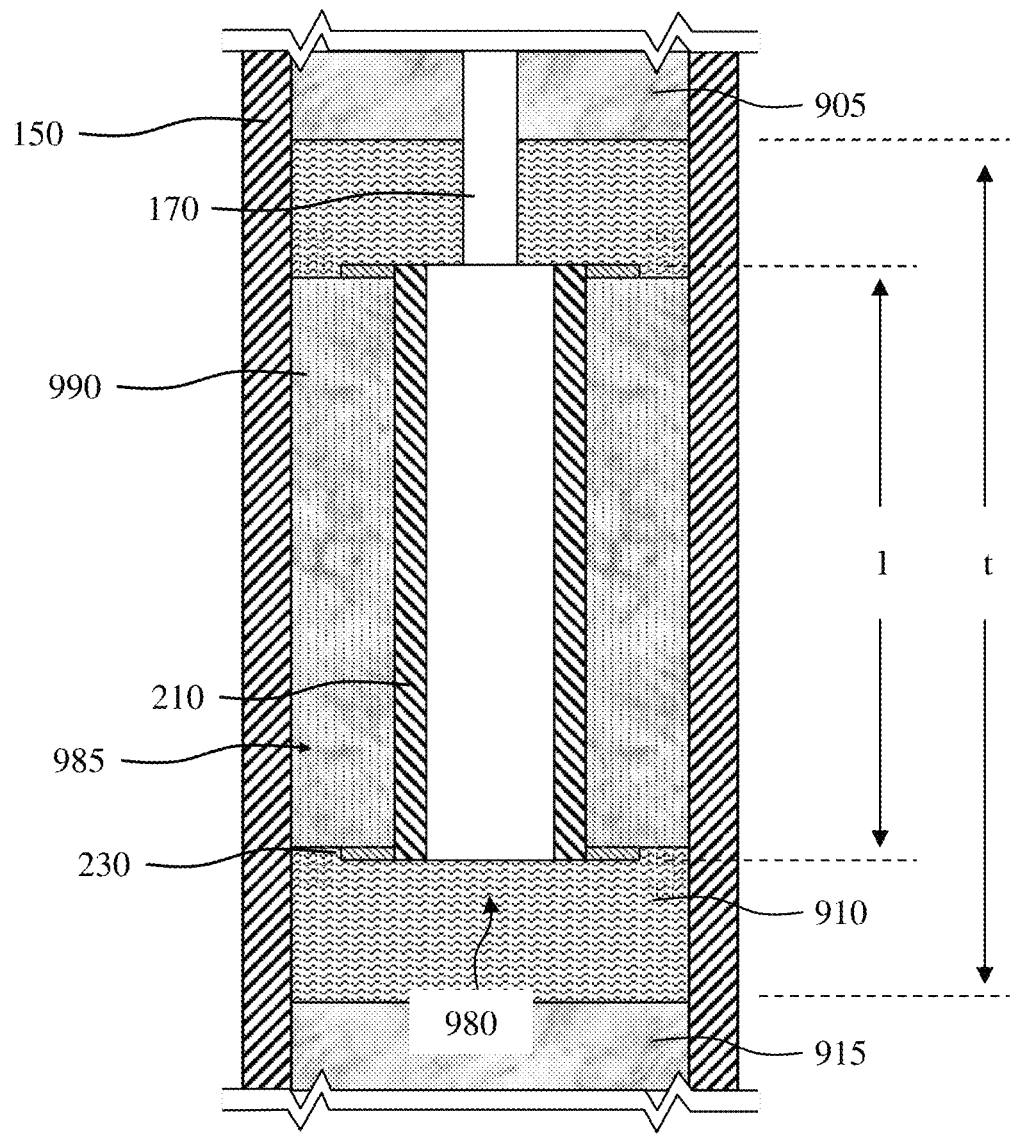

Turning now to FIGS. 9I and 9J, illustrated are the well system 900 and downhole tool 980 of FIGS. 9G and 9H, after the reactive fluid within the slug of the reactive colloidal dispersion of colloid particles 910 causes the expandable metal member 220 to expand in response to hydrolysis, and thereby form an expanded metal member 985. In accordance with the disclosure, given that the slug of the reactive colloidal dispersion of colloid particles 910 includes the colloid particles, the expanded metal member 985 benefits from the inclusion of the colloid particles 990 in interstitial spaces thereof. Accordingly, the expanded metal member 985 having the colloid particles 990 is more impervious to fluid and/or gas migration therethrough, as compared to a traditional expanded metal member.

Aspects Disclosed Herein Include:

A. A downhole tool, the downhole tool including: 1) a housing; 2) an expandable metal member positioned about the housing, the expandable metal member comprising a metal configured to expand in response to hydrolysis; and 3) colloid particles surrounding a surface of the expandable metal member.

B. A well system, the well system including: 1) a wellbore positioned within a subterranean formation; 2) a downhole tool positioned within the wellbore, the downhole tool including: a) a housing; b) an expandable metal member positioned about the housing, the expandable metal member comprising a metal configured to expand in response to hydrolysis; and 3) colloid particles surrounding a surface of the expandable metal member.

C. A method, the method including: 1) positioning a downhole tool within a wellbore of a subterranean formation, the downhole tool including: a) a housing; b) an expandable metal member positioned about the housing, the expandable metal member comprising a metal configured to expand in response to hydrolysis; and c) colloid particles surrounding a surface of the expandable metal member; 2) subjecting the expandable metal member to a reactive fluid while in the presence of the colloid particles, thereby forming an expanded metal member having the colloid particles in interstitial spaces thereof.

D. A well system, the well system including: 1) a wellbore positioned within a subterranean formation; 2) a downhole tool positioned within the wellbore, the downhole tool including: a) a housing; and b) an expandable metal member positioned about the housing, the expandable metal member comprising a metal configured to expand in response to hydrolysis; and c) a reactive colloidal dispersion of colloid particles surrounding a surface of the expandable metal member.

E. A method, the method including: 1) positioning a downhole tool within a wellbore of a subterranean formation, the downhole tool including: a) a housing; and b) an expandable metal member positioned about the housing, the expandable metal member comprising a metal configured to expand in response to hydrolysis; and 2) positioning a reactive colloidal dispersion of colloid particles about a surface of the expandable metal member, thereby forming an expanded metal member having the colloid particles in interstitial spaces thereof.

Aspects A, B, C, D and E may have one or more of the following additional elements in combination: Element 1: further including a dissolvable sleeve positioned about the colloid particles, the dissolvable sleeve configured to keep the colloid particles proximate the expandable metal member until such time as the expandable metal member is to undergo the hydrolysis. Element 2: wherein the colloid particles are a powder of colloid particles, the dissolvable sleeve holding the powder of colloid particles proximate the expandable metal member until such time as the expandable metal member is to undergo the hydrolysis. Element 3: wherein the colloid particles form a part of a non-reactive colloidal dispersion of colloid particles, the dissolvable sleeve holding the non-reactive colloidal dispersion of colloid particles proximate the expandable metal member until such time as the expandable metal member is to undergo the hydrolysis. Element 4: wherein the non-reactive colloidal dispersion of colloid particles is a sturdy non-reactive colloidal dispersion of colloid particles. Element 5: wherein the non-reactive colloidal dispersion of colloid particles is an extremely sturdy non-reactive colloidal dispersion of colloid particles. Element 6: wherein the non-reactive colloidal dispersion of colloid particles is an excessively sturdy non-reactive colloidal dispersion of colloid particles. Element 7: wherein the non-reactive colloidal dispersion of colloid particles is a combination of a non-reactive fluid and the colloid particles. Element 8: wherein the non-reactive fluid is oil. Element 9: wherein the colloid particles are small colloid particles. Element 10: wherein the colloid particles are extremely small colloid particles. Element 11: wherein the colloid particles are excessively small colloid particles. Element 12: wherein the colloid particles are latex colloid particles. Element 13: wherein the colloid particles are clay colloid particles. Element 14: further including a dissolvable sleeve positioned about the colloid particles, the dissolvable sleeve configured to keep the colloid particles proximate the expandable metal member until such time as the expandable metal member is to undergo the hydrolysis, and further wherein the subjecting dissolves the dissolvable sleeve and allows the reactive fluid to encounter the expandable metal and form the expanded metal. Element 15: wherein the colloid particles are a powder of colloid particles, the dissolvable sleeve holding the powder of colloid particles proximate the expandable metal member until such time as the expandable metal member is to undergo the hydrolysis. Element 16: wherein the subjecting causes the powder of colloid particles and the reactive fluid to form a reactive colloidal dispersion of colloid particles. Element 17: wherein the colloid particles form a part of a non-reactive colloidal dispersion of colloid particles, the dissolvable sleeve holding the non-reactive colloidal dispersion of colloid particles proximate the expandable metal member until such time as the expandable metal member is to undergo the hydrolysis. Element 18: wherein the subjecting causes the colloid particles in the non-reactive colloidal dispersion of colloid particles and the reactive fluid to form a reactive colloidal dispersion of colloid particles. Element 19: wherein the reactive colloidal dispersion of colloid particles is a sturdy reactive colloidal dispersion of colloid particles. Element 20: wherein the reactive colloidal dispersion of colloid particles is an extremely sturdy reactive colloidal dispersion of colloid particles. Element 21: wherein the reactive colloidal dispersion of colloid particles is an excessively sturdy reactive colloidal dispersion of colloid particles. Element 22: wherein the colloid particles are ionically charged colloid particles. Element 23: wherein positioning the reactive colloidal dispersion of colloid particles about the surface of the expandable metal member includes filling the wellbore above the downhole tool with the reactive colloidal dispersion of colloid particles. Element 24: wherein positioning the reactive colloidal dispersion of colloid particles about the surface of the expandable metal member includes filling the wellbore with a slug of the reactive colloidal dispersion of colloid particles and a slug of fluid without the colloid particles. Element 25: wherein the slug of the reactive colloidal dispersion of colloid particles is pumped downhole prior to the slug of fluid without the colloid particles. Element 26: wherein the slug of fluid without the colloidal particles is an uphole slug of fluid without the colloidal particles, and further including pumping a downhole slug of fluid without the colloidal particles prior to pumping the slug of the reactive colloidal dispersion of the colloid particles. Element 27: wherein the downhole slug of fluid without the colloidal particles is a non-reactive slug of fluid. Element 28: wherein the downhole tool has a length (l), and further wherein the slug of the reactive colloidal dispersion of colloid particles has a thickness (t) greater than the length (l) of the downhole tool. Element 29: wherein the slug of the reactive colloidal dispersion of colloid particles has a thickness (t) less than 10 times the length (l) of the downhole tool. Element 30: wherein the slug of the reactive colloidal dispersion of colloid particles has a thickness (t) less than 3 times the length (l) of the downhole tool. Element 31: wherein the slug of the reactive colloidal dispersion of colloid particles has a thickness (t) less than 1.5 times the length (l) of the downhole tool.

Those skilled in the art to which this application relates will appreciate that other and further additions, deletions, substitutions and modifications may be made to the described embodiments.

What is claimed is:

1. A downhole tool, comprising:
   a housing;
   an expandable metal member positioned about the housing, the expandable metal member comprising a metal configured to expand in response to hydrolysis, wherein the expandable metal includes magnesium or aluminum;
   colloid particles surrounding a surface of the expandable metal member; and
   a dissolvable sleeve positioned about the colloid particles, the dissolvable sleeve configured to keep the colloid particles proximate the expandable metal member until such time as the expandable metal member is to undergo the hydrolysis.

2. The downhole tool as recited in claim 1, wherein the colloid particles are a powder of colloid particles, the dissolvable sleeve holding the powder of colloid particles proximate the expandable metal member until such time as the expandable metal member is to undergo the hydrolysis.

3. The downhole tool as recited in claim 1, wherein the colloid particles form a part of a non-reactive colloidal dispersion of colloid particles, the dissolvable sleeve holding the non-reactive colloidal dispersion of colloid particles proximate the expandable metal member until such time as the expandable metal member is to undergo the hydrolysis.

4. The downhole tool as recited in claim 3, wherein the non-reactive colloidal dispersion of colloid particles is a sturdy non-reactive colloidal dispersion of colloid particles, wherein sturdy non-reactive colloidal dispersion means that less than 15 percent of the non-reactive colloid particles would settle out of the dispersion within a 24 hour period.

5. The downhole tool as recited in claim 3, wherein the non-reactive colloidal dispersion of colloid particles is an extremely sturdy non-reactive colloidal dispersion of colloid particles, wherein extremely sturdy non-reactive colloidal dispersion means that less than 10 percent of the non-reactive colloid particles would settle out of the dispersion within a 24 hour period.

6. The downhole tool as recited in claim 3, wherein the non-reactive colloidal dispersion of colloid particles is an excessively sturdy non-reactive colloidal dispersion of colloid particles, wherein excessively sturdy non-reactive colloidal dispersion means that less than 5 percent of the non-reactive colloid particles would settle out of the dispersion within a 24 hour period.

7. The downhole tool as recited in claim 3, wherein the non-reactive colloidal dispersion of colloid particles is a combination of a non-reactive fluid and the colloid particles.

8. The downhole tool as recited in claim 7, wherein the non-reactive fluid is oil.

9. The downhole tool as recited in claim 1, wherein the colloid particles are small colloid particles with a greatest dimension of no more than 300 nm.

10. The downhole tool as recited in claim 1, wherein the colloid particles are extremely small colloid particles with a greatest dimension of no more than 150 nm.

11. The downhole tool as recited in claim 1, wherein the colloid particles are excessively small colloid particles with a greatest dimension of no more than 50 nm.

12. The downhole tool as recited in claim 1, wherein the colloid particles are latex colloid particles.

13. The downhole tool as recited in claim 1, wherein the colloid particles are clay colloid particles.

14. A well system, comprising:
    a wellbore positioned within a subterranean formation;
    a downhole tool positioned within the wellbore, the downhole tool including:
    a housing;
    an expandable metal member positioned about the housing, the expandable metal member comprising a metal configured to expand in response to hydrolysis, wherein the expandable metal includes magnesium or aluminum;
    colloid particles surrounding a surface of the expandable metal member; and
    a dissolvable sleeve positioned about the colloid particles, the dissolvable sleeve configured to keep the colloid particles proximate the expandable metal member until such time as the expandable metal member is to undergo the hydrolysis.

15. The well system as recited in claim 14, wherein the colloid particles are a powder of colloid particles, the dissolvable sleeve holding the powder of colloid particles proximate the expandable metal member until such time as the expandable metal member is to undergo the hydrolysis.

16. The well system as recited in claim 14, wherein the colloid particles form a part of a non-reactive colloidal dispersion of colloid particles, the dissolvable sleeve holding the non-reactive colloidal dispersion of colloid particles proximate the expandable metal member until such time as the expandable metal member is to undergo the hydrolysis.

17. The well system as recited in claim 16, wherein the non-reactive colloidal dispersion of colloid particles is a sturdy non-reactive colloidal dispersion of colloid particles, wherein sturdy non-reactive colloidal dispersion means that less than 15 percent of the non-reactive colloid particles would settle out of the dispersion within a 24 hour period.

18. The well system as recited in claim 16, wherein the non-reactive colloidal dispersion of colloid particles is an extremely sturdy non-reactive colloidal dispersion of colloid particles, wherein extremely sturdy non-reactive colloidal dispersion means that less than 10 percent of the non-reactive colloid particles would settle out of the dispersion within a 24 hour period.

19. The well system as recited in claim 16, wherein the non-reactive colloidal dispersion of colloid particles is an excessively sturdy non-reactive colloidal dispersion of colloid particles, wherein excessively sturdy non-reactive colloidal dispersion means that less than 5 percent of the non-reactive colloid particles would settle out of the dispersion within a 24 hour period.

20. The well system as recited in claim 16, wherein the non-reactive colloidal dispersion of colloid particles is a combination of a non-reactive fluid and the colloid particles.

21. The well system as recited in claim 20, wherein the non-reactive fluid is oil.

22. The well system as recited in claim 14, wherein the colloid particles are small colloid particles with a greatest dimension of no more than 300 nm.

23. The well system as recited in claim 14, wherein the colloid particles are extremely small colloid particles with a greatest dimension of no more than 150 nm.

24. The well system as recited in claim 14, wherein the colloid particles are excessively small colloid particles with a greatest dimension of no more than 50 nm.

25. The well system as recited in claim 14, wherein the colloid particles are latex colloid particles.

26. The well system as recited in claim 14, wherein the colloid particles are clay colloid particles.

27. A method, comprising:
positioning a downhole tool within a wellbore of a subterranean formation, the downhole tool including:
a housing;
an expandable metal member positioned about the housing, the expandable metal member comprising a metal configured to expand in response to hydrolysis, wherein the expandable metal includes magnesium or aluminum;
colloid particles surrounding a surface of the expandable metal member; and
a dissolvable sleeve positioned about the colloid particles, the dissolvable sleeve configured to keep the colloid particles proximate the expandable metal member until such time as the expandable metal member is to undergo the hydrolysis; and
subjecting the expandable metal member to a reactive fluid while in the presence of the colloid particles, thereby forming an expanded metal member having the colloid particles in interstitial spaces thereof.

28. The method as recited in claim 27, wherein the subjecting dissolves the dissolvable sleeve and allows the reactive fluid to encounter the expandable metal and form the expanded metal.

29. The method as recited in claim 28, wherein the colloid particles are a powder of colloid particles, the dissolvable sleeve holding the powder of colloid particles proximate the expandable metal member until such time as the expandable metal member is to undergo the hydrolysis.

30. The method as recited in claim 29, wherein the subjecting causes the powder of colloid particles and the reactive fluid to form a reactive colloidal dispersion of colloid particles.

31. The method as recited in claim 28, wherein the colloid particles form a part of a non-reactive colloidal dispersion of colloid particles, the dissolvable sleeve holding the non-reactive colloidal dispersion of colloid particles proximate the expandable metal member until such time as the expandable metal member is to undergo the hydrolysis.

32. The method as recited in claim 31, wherein the non-reactive colloidal dispersion of colloid particles is a combination of a non-reactive fluid and the colloid particles.

33. The method tool as recited in claim 32, wherein the non-reactive fluid is oil.

34. The method as recited in claim 31, wherein the subjecting causes the colloid particles in the non-reactive colloidal dispersion of colloid particles and the reactive fluid to form a reactive colloidal dispersion of colloid particles.

35. A downhole tool, comprising:
a housing;
an expandable metal member positioned about the housing, the expandable metal member comprising a metal configured to expand in response to hydrolysis, wherein the expandable metal includes magnesium or aluminum; and
colloid particles surrounding a surface of the expandable metal member, wherein the colloid particles are latex colloid particles.

36. A well system, comprising:
a wellbore positioned within a subterranean formation;
a downhole tool positioned within the wellbore, the downhole tool including:
a housing;
an expandable metal member positioned about the housing, the expandable metal member comprising a metal configured to expand in response to hydrolysis, wherein the expandable metal includes magnesium or aluminum; and
colloid particles surrounding a surface of the expandable metal member, wherein the colloid particles are latex colloid particles.

37. A method, comprising:
positioning a downhole tool within a wellbore of a subterranean formation, the downhole tool including:
a housing;
an expandable metal member positioned about the housing, the expandable metal member comprising a metal configured to expand in response to hydrolysis, wherein the expandable metal includes magnesium or aluminum; and
colloid particles surrounding a surface of the expandable metal member, wherein the colloid particles are latex colloid particles;
subjecting the expandable metal member to a reactive fluid while in the presence of the colloid particles, thereby forming an expanded metal member having the colloid particles in interstitial spaces thereof.

* * * * *

UNITED STATES PATENT AND TRADEMARK OFFICE
CERTIFICATE OF CORRECTION

| | | |
|---|---|---|
| PATENT NO. | : 12,326,063 B2 | Page 1 of 1 |
| APPLICATION NO. | : 18/466132 | |
| DATED | : June 10, 2025 | |
| INVENTOR(S) | : Roberto Vega, Rutger Evers and Michael Linley Fripp | |

It is certified that error appears in the above-identified patent and that said Letters Patent is hereby corrected as shown below:

In the Specification

In Column 7, Line 45, after --stamped,-- delete "croded" and insert --eroded--

Signed and Sealed this
Twenty-sixth Day of August, 2025

Coke Morgan Stewart
*Acting Director of the United States Patent and Trademark Office*